(12) United States Patent
Goel et al.

(10) Patent No.: US 9,779,534 B2
(45) Date of Patent: Oct. 3, 2017

(54) PREFIXED SUMMED LENGTH IN GRAPHICS PROCESSING

(71) Applicant: QUALCOMM Incorporated, San Diego, CA (US)

(72) Inventors: Vineet Goel, La Jolla, CA (US); Usame Ceylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/321,409

(22) Filed: Jul. 1, 2014

(65) Prior Publication Data

US 2015/0062142 A1  Mar. 5, 2015

Related U.S. Application Data

(60) Provisional application No. 61/871,260, filed on Aug. 28, 2013.

(51) Int. Cl.

| | |
|---|---|
| *G09G 5/00* | (2006.01) |
| *G06T 15/00* | (2011.01) |
| *G06T 15/80* | (2011.01) |
| *G06T 1/20* | (2006.01) |
| *G06T 11/00* | (2006.01) |
| *G06T 11/20* | (2006.01) |

(Continued)

(52) U.S. Cl.
CPC ............. *G06T 15/005* (2013.01); *G06T 1/20* (2013.01); *G06T 11/001* (2013.01); *G06T 11/203* (2013.01); *G06T 11/40* (2013.01); *G06T 15/80* (2013.01); *G06T 1/60* (2013.01); *G06T 15/04* (2013.01); *G09G 5/363* (2013.01)

(58) Field of Classification Search
CPC ..... G06T 15/04; G06T 11/001; G06T 15/005; G06T 1/60; G09G 5/363
See application file for complete search history.

(56) References Cited

U.S. PATENT DOCUMENTS

| | | | |
|---|---|---|---|
| 6,292,192 B1 * | 9/2001 | Moreton | G06T 17/30 |
| | | | 345/423 |
| 7,589,730 B1 * | 9/2009 | Brown | G06T 11/203 |
| | | | 345/441 |

(Continued)

FOREIGN PATENT DOCUMENTS

| | | |
|---|---|---|
| EP | 2883211 A1 | 6/2015 |
| JP | 2010134347 A | 6/2010 |

(Continued)

OTHER PUBLICATIONS

Akenine-Moller, et al., "Real-Time Rendering, 2nd edition", A K Peters, 2002, Section 4.4 Aliasing and Antialiasing, XP002383909, pp. 84-101.

(Continued)

*Primary Examiner* — Abderrahim Merouan

(57) ABSTRACT

In an example, rendering graphics data includes determining, with a graphics processing unit (GPU), a texture offset for a current segment of a plurality of ordered segments of a dashed line, where the texture offset for the current segment of the plurality of ordered segments is based on an accumulation of lengths of segments that precede the current segment in the order, and pixel shading the current segment including applying the texture offset to determine a location of the current segment.

30 Claims, 12 Drawing Sheets

(51) Int. Cl.
*G06T 11/40* (2006.01)
*G06T 1/60* (2006.01)
*G06T 15/04* (2011.01)
*G09G 5/36* (2006.01)

(56) References Cited

U.S. PATENT DOCUMENTS

| | | | |
|---|---|---|---|
| 7,808,512 B1 | 10/2010 | Hutchins et al. | |
| 7,817,152 B2 | 10/2010 | Kokojima | |
| 8,044,955 B1* | 10/2011 | Yhann | G06T 17/20 345/419 |
| 8,094,157 B1* | 1/2012 | Le Grand | G06F 7/24 345/501 |
| 9,275,498 B2 | 3/2016 | Ceylan et al. | |
| 9,412,197 B2 | 8/2016 | Goel et al. | |
| 2007/0165838 A1* | 7/2007 | Li | H04M 9/082 379/406.01 |
| 2007/0263926 A1* | 11/2007 | Kokojima | G06T 11/40 382/162 |
| 2008/0198168 A1 | 8/2008 | Jiao et al. | |
| 2008/0208850 A1* | 8/2008 | Boyce | G06F 17/30985 |
| 2009/0219287 A1* | 9/2009 | Wang | G06T 15/50 345/426 |
| 2009/0251476 A1 | 10/2009 | Jiao et al. | |
| 2010/0013854 A1* | 1/2010 | Michail | G06T 11/40 345/615 |
| 2011/0285711 A1 | 11/2011 | Kilgard | |
| 2011/0285724 A1* | 11/2011 | Kilgard | G06T 11/203 345/443 |
| 2011/0285736 A1* | 11/2011 | Kilgard | G06T 11/203 345/584 |
| 2011/0285741 A1* | 11/2011 | Kilgard | G06T 11/203 345/589 |
| 2012/0013624 A1 | 1/2012 | Fowler | |
| 2012/0086715 A1 | 4/2012 | Patel et al. | |
| 2012/0249569 A1* | 10/2012 | Kokojima | G06T 11/203 345/582 |
| 2013/0002678 A1* | 1/2013 | Cornell | G06T 11/203 345/467 |
| 2013/0265307 A1 | 10/2013 | Goel et al. | |
| 2013/0265308 A1 | 10/2013 | Goel et al. | |
| 2013/0293554 A1* | 11/2013 | Vostrikov | G06T 11/203 345/442 |
| 2014/0333621 A1* | 11/2014 | Hillesland | G06T 15/04 345/423 |
| 2015/0062124 A1 | 3/2015 | Goel | |

FOREIGN PATENT DOCUMENTS

| | | |
|---|---|---|
| JP | 2010519618 A | 6/2010 |
| JP | 2013539095 A | 10/2013 |
| JP | 2015524092 | 8/2015 |
| JP | 2015528598 | 9/2015 |
| JP | 2015529859 | 10/2015 |
| JP | 2015529860 | 10/2015 |
| KR | 20070092586 A | 9/2007 |
| KR | 20140052499 A | 5/2014 |
| WO | 2008011210 | 8/2008 |
| WO | 2013151748 | 10/2013 |
| WO | 2013151750 | 10/2013 |
| WO | 2013151751 | 10/2013 |
| WO | 2014025483 A1 | 2/2014 |
| WO | 2014025516 A1 | 2/2014 |
| WO | 2014025517 A1 | 2/2014 |

OTHER PUBLICATIONS

Response to Written Opinion dated Sep. 29, 2014, from International Application No. PCT/US2014/045309, filed on Jun. 25, 2015, 4 pp.
Second Written Opinion from International Application No. PCT/US2014/045309, dated Aug. 20, 2015, 7 pp.
Response to Second Written Opinion dated Aug. 20, 2015, from International Application No. PCT/US2014/045309, filed on Oct. 20, 2015, 18 pp.
International Preliminary Report on Patentability from from International Application No. PCT/US2014/045309, dated Dec. 21, 2015, 9 pp.
Office Action from U.S. Appl. No. 14/321,309, dated Aug. 14, 2015, 11 pp.
Response to Office Action dated Aug. 14, 2015, from U.S. Appl. No. 14/321,309, filed on Nov. 13, 2015, 12 pp.
Notice of Allowance from U.S. Appl. No. 14/321,309, dated Jan. 14, 2016, 8 pp.
International Search Report and Written Opinion from International Application No. PCT/US2014/045299, dated Sep. 29, 2014, 13 pp.
Reply to First Written Opinion dated Sep. 29, 2014, from corresponding PCT Application Serial No. PCT/US2014/045299 filed on Jun. 25, 2015, 6 pp.
Second Written Opinion from corresponding PCT Application Serial No. PCT/US2014/045299 dated Aug. 21, 2015, 6 pp.
Reply to Second Written Opinion dated Aug. 21, 2015 from corresponding PCT Application Serial No. PCT/US2014/045299 filed Oct. 21, 2015 , 17 pp.
International Search Report and Written Opinion from International Application No. PCT/US2014/045309, dated Dec. 21, 2015, 9 pp.
International Search Report and Written Opinion from International Application No. PCT/US2014/045309, dated Sep. 29, 2014, 11 pp.
Kilgard, et al., "GPU-accelerated Path Rendering", Computer Graphics Proceedings, SIGGraph Asia, Nov. 2012, 10 pp.
Zink et al., "Practical Rendering & Computation with Direct3D 11," Overview of Direct 3D, CRC Press, Nov. 2, 2011, pp. 4-7.
Korean Office Action from Application Serial No. 2016-7006056 dated Jun. 15, 2016 (6 pages).

* cited by examiner

PREFIXED SUMMED LENGTH IN GRAPHICS PROCESSING

This application claims the benefit of U.S. Provisional Application No. 61/871,260, filed Aug. 28, 2013, the entire contents of which is hereby incorporated by reference.

TECHNICAL FIELD

This disclosure relates to graphics processing, and more particularly, to techniques for path rendering.

BACKGROUND

Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

Path rendering may be implemented in a central processing unit (CPU). However, such an approach may be CPU-intensive, and may therefore limit the amount of CPU processing cycles available for other CPU tasks. Moreover, in some cases, a relatively large amount of data may need to be transferred to a graphics processing unit (GPU) to render the path segment at a desired level of detail. The relatively large amount of data may consume a significant amount of memory storage space when storing the data, and may consume a significant amount of memory bandwidth when transferring the data to the GPU.

SUMMARY

This disclosure includes techniques for generating graphics data with path filling and dashing. For example, when filling a path, according to aspects of this disclosure, a GPU may perform stenciling operations at a different rate than the rate at which memory is allocated for rendered data (referred to as a render target). That is, a stencil parameter for performing stencil operations may be specified independently from a render target parameter for storing rendered data.

In addition, with respect to dashing, according to aspects of this disclosure, a GPU may determine dash characteristics and perform dashing in a single rendering pass. For example, the GPU may calculate the length of each of the segments as the segments are determined and apply the length information to determine a starting location (e.g., a texture coordinate) for each dash segment.

In an example, a method of rendering graphics data includes determining a stencil parameter that indicates a sampling rate for determining a coverage value for each antialiased pixel of a path of an image, determining, separately from the stencil parameter, a render target parameter that indicates a memory allocation for each antialiased pixel of the path, and rendering the path using the stencil parameter and the render target parameter.

In another example, an apparatus for rending graphics includes a graphics processing unit (GPU) configured to determine a stencil parameter that indicates a sampling rate for determining a coverage value for each antialiased pixel of a path of an image, determine, separately from the stencil parameter, a render target parameter that indicates a memory allocation for each antialiased pixel of the path, and render the path using the stencil parameter and the render target parameter.

In another example, an apparatus for rendering graphics data includes means for determining a stencil parameter that indicates a sampling rate for determining a coverage value for each antialiased pixel of a path of an image, means for determining, separately from the stencil parameter, a render target parameter that indicates a memory allocation for each antialiased pixel of the path, and means for rendering the path using the stencil parameter and the render target parameter.

In another example, a non-transitory computer-readable medium has instructions stored thereon that, when executed, cause a graphics processing unit (GPU) to determine a stencil parameter that indicates a sampling rate for determining a coverage value for each antialiased pixel of a path of an image, determine, separately from the stencil parameter, a render target parameter that indicates a memory allocation for each antialiased pixel of the path, and render the path using the stencil parameter and the render target parameter.

In another example, a method of rendering graphics data includes determining, with a graphics processing unit (GPU), a texture offset for a current segment of a plurality of ordered segments of a dashed line, wherein the texture offset for the current segment of the plurality of ordered segments is based on an accumulation of lengths of segments that precede the current segment in the order, and pixel shading the current segment including applying the texture offset to determine a location of the current segment.

In another example, an apparatus for rendering graphics data includes a graphics processing unit (GPU) configured to determine a texture offset for a current segment of a plurality of ordered segments of a dashed line, wherein the texture offset for the current segment of the plurality of ordered segments is based on an accumulation of lengths of segments that precede the current segment in the order, and pixel shade the current segment including applying the texture offset to determine a location of the current segment.

In another example, an apparatus for rendering graphics data includes means for determining, with a graphics processing unit (GPU), a texture offset for a current segment of a plurality of ordered segments of a dashed line, wherein the texture offset for the current segment of the plurality of ordered segments is based on an accumulation of lengths of segments that precede the current segment in the order, and means for pixel shading the current segment including applying the texture offset to determine a location of the current segment.

In another example, a non-transitory computer-readable medium has instructions stored thereon that, when executed, cause a graphics processing unit (GPU) configured to determine a texture offset for a current segment of a plurality of ordered segments of a dashed line, wherein the texture offset for the current segment of the plurality of ordered segments is based on an accumulation of lengths of segments that precede the current segment in the order, and pixel shade the current segment including applying the texture offset to determine a location of the current segment.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
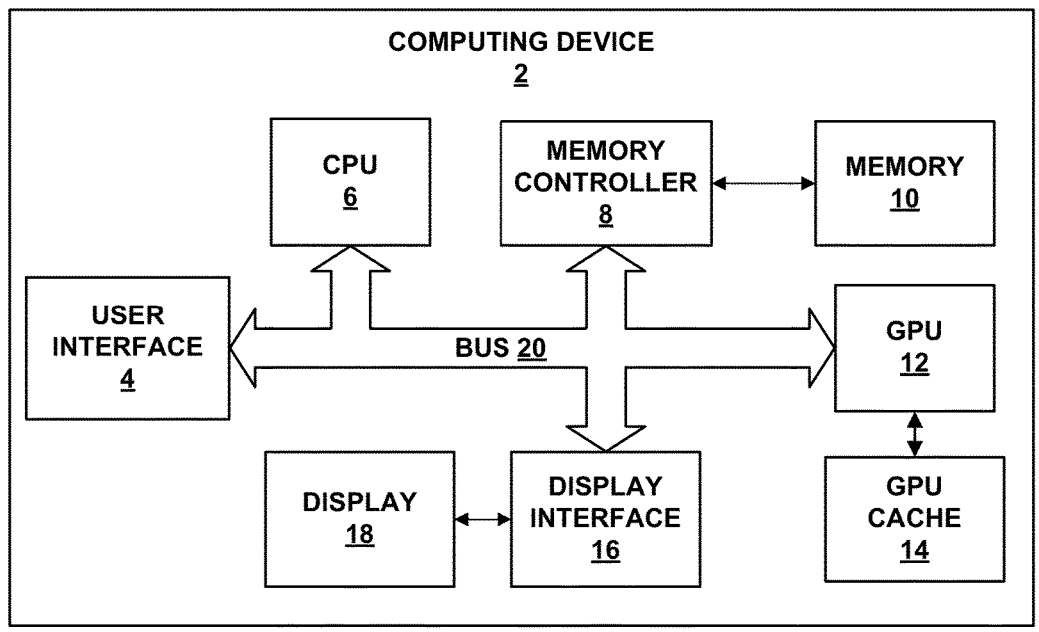
FIG. 1 is a block diagram illustrating an example computing device that may be used to implement the techniques of this disclosure.

This disclosure is directed to techniques for performing GPU based path rendering. Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

GPUs typically implement a three-dimensional (3D) graphics pipeline that is designed to be compliant with one or more 3D graphics APIs. Because the prevailing 3D graphics APIs in use today do not require that compliant devices support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but is not capable of directly rendering curved path rendering primitives (such as, e.g., elliptic arcs and Bézier curves).

One approach for path rendering may involve using a 3D GPU pipeline to provide partial GPU hardware acceleration for the execution of path rendering commands. This approach involves preprocessing a path segment with a central processing unit (CPU) in order to convert the path segment into one or more low-order, non-curved, 3D graphics primitives that can be rasterized by the GPU. For example, a CPU may tessellate a curved path segment (e.g., an elliptic arc or a Bézier curve) into a set of relatively small triangles that approximates the curvature of the path segment, and may cause the set of triangles to be rendered using the GPU. Such an approach, however, may be CPU-intensive, and may therefore limit the amount of CPU processing cycles available for other CPU tasks. Moreover, in some cases, a relatively large amount of triangles may be needed to render the path segment at a desired level of detail. The relatively large amount of triangles may consume a significant amount of memory storage space when storing the data, and may consume a significant amount of memory bandwidth when transferring the data to the GPU.

Another approach for providing partial-to-total GPU hardware acceleration for the execution of path rendering commands may involve modifying the architecture of the GPU to support a dedicated, hardware-accelerated, path rendering pipeline. However, because the prevailing 3D graphics APIs (e.g., the Microsoft® DirectX 11 (DX) API) typically do not require a GPU architecture to include a dedicated path rendering pipeline, such an approach does not result in a cross-platform, hardware-accelerated, path rendering solution that would be guaranteed to be supported by all GPUs which are compliant with a particular 3D graphics API (e.g., the DX 11 API).

In some examples, a GPU-based path rendering technique may be used in which the GPU is configured to tessellate a received path segment into a plurality of line segments, and to render the tessellated line segments using a 3D graphics pipeline. By using the GPU to tessellate a path segment into line segments, the burden of preprocessing path segments is lifted from the CPU, thereby freeing up processing resources for other CPU tasks. Moreover, the GPU may, in some examples, utilize a highly-parallel, modern GPU tessellation architecture to perform the tessellation operations, which may, in some examples, allow the GPU to render a path segment in a more efficient manner than the CPU. In addition, because the tessellation occurs in the GPU, rather than in the CPU, a multitude of tessellated primitives do not need to be stored in system memory and do not need to be passed from the CPU to the GPU, thereby reducing the memory footprint needed for path rendering as well as the memory bandwidth needed for path rendering.

In some examples, a GPU may use a multi-sample anti-aliasing (MSAA) technique to perform antialiasing. For example, pixels are uniformly colored and always of the same shape, which may result in lines of a rendered image becoming jagged in appearance. With MSAA, multiple samples may be generated for a single pixel. The samples may then be combined (e.g., averaged) to determine a final pixel value.

Accordingly, in some instances, a GPU may render an image at a higher resolution than the resolution being displayed. The GPU may then down-sample the image to the appropriate size prior to display. The result may be smoother transitions from one line of pixels to another along the edges of objects. MSAA may be performed using a factor of 4, 8, 16, or other values. When performing MSAA, the GPU may sample depth and stencil operations at the MSAA rate, allocate memory at the MSAA rate, and rasterize pixels at the MSAA rate (e.g., 16×MSAA includes 16× depth/stencil samples per pixel, and 16× memory allocation per pixel, and 16× rasterization samples per pixel).

In general, a "target" may refer to memory allocated for a rendered pixel. Typically, with respect to antialiased images, a sampling rate for performing graphics operations such as rasterization and a memory allocation for the rendered target correspond with each other, e.g., 1:1. Thus, in an example for purposes of illustration, a GPU may use a sampling rate of 16× per pixel for rasterization and allocate memory to store 16 samples per pixel. However, in target independent rasterization (TIR), the sampling rate of the rasterization process may be specified independently from the memory allocated for the rendered image. For example, a sampling rate of four samples per pixel may be used for rasterization, while a memory allocation for storing color of pixels of the image may be one color per pixel in the image.

While TIR allows a rasterization rate to be independently specified from the memory allocated for the target, other rendering operations may remain tied together. For example, depth and stenciling operations (as described in greater detail below) may typically be associated with the render target. Accordingly, a single render target is specified per pixel, depth and stencil operations may also be performed at the same rate (i.e., 1× sampling rate).

According to aspects of this disclosure, a GPU may leverage the concept of TIR in stenciling operations. For example, the GPU may perform stenciling at a higher rate than the amount of memory that is allocated for a particular pixel. That is, in a process in which stencil operations are super-sampled, e.g., each pixel will have 16 samples, the GPU may render by computing the coverage value per pixel based on which sample of the pixel (of the super sampled pixel) passed the stencil test, e.g., was inside a particular path. For performance improvement, a render target may be 1× sampled while the stencil may be 16× sampled. The GPU may assign each pixel a coverage value based on a per sample stencil test. Specifying a stenciling sampling rate independently from the target and the rasterization rate may be referred to herein as stenciled TIR.

The stenciled TIR process may be applied during path rendering. For example, when path rendering, a GPU may typically perform the following example functions to fill a path: tessellate the path into line segments, connect line segments to a pivot point to form triangles, and render triangles to a stencil buffer (including, in some instances, performing a depth test), where the stencil buffer indicates visible pixels in of the image. The next and possibly final steps of the filling process are to render a bounding box with a stencil test enabled and to copy the contents of the stencil buffer to a frame buffer. This approach requires two rendering passes, e.g., one pass to render the bounding box and one pass to render the texture.

According to aspects of this disclosure, a GPU may fill a path in a single rendering pass, without the need to pre-process a bounding box. For example, in some examples, a GPU may incorporate a bounding box unit, which may include hardware that is used at a rasterizer stage. For example, as primitives are rendered to a stencil buffer, the bounding box unit may track the outermost coordinate points of a given path (e.g., top, bottom, left, and right extrema). The outermost coordinate points may also be referred to as maximum boundary points, in the sense that these points indicate the outermost boundary of the path. After stenciling is complete, the bounding box unit has determined a bounding rectangle based on the outermost coordinate points.

In the example above, the GPU does not shade the primitives of the path as they are rendered to the stencil buffer (the primitives only affect the stencil). The GPU may then render the bounding box using the stencil buffer to assign the color. According to aspects of this disclosure, another draw call is not needed after performing the stenciling and determining the bounding box. Rather, the GPU rasterizes the bounding box using stenciled TIR in a single pass.

In this way, the GPU may fill (e.g., perform stencil and color operations) in a single pass, rather than, for example, determining primitives at a GPU, determining a bounding box at a CPU, and performing color operations on the GPU. That is, techniques of this disclosure include a bounding box optimization that allows the GPU to determine a bounding box (e.g., during tessellation, which the GPU may then push to a rasterizer) so that both stencil and color can be performed in a single pass.

Other aspects of this disclosure relate to dashing (such as a dashed line). For example, when dashing a stroked path, the GPU may render dash segments in order (referred to as a segment order), and may generate one segment where the previous segments left off. That is, the GPU determines a starting location for each segment in the dash pattern only after shading the previous segment. Such computations may reduce parallelism of graphics processing and require more than one rendering pass to perform, because the locations for each section of the dash need to be processed in order to determine the correct starting location.

According to aspects of this disclosure, the GPU may determine dash characteristics and perform dashing in a single pass, e.g. a single rendering pass. For example, the GPU may calculate the length of each of the segments as the segments are determined, e.g., during geometry shading. That is, the GPU may accumulate the lengths of the segments, e.g., segments preceding a current segment in a segment order, to determine a starting location of a current segment. This accumulation of lengths may be referred to herein as a "prefix length" or "prefix summed length." The GPU may also determine the total length of the line.

In an example for purposes of illustration, the GPU may determine a first segment of a dashed line. The GPU may also determine a second segment of the dashed line. The GPU may determine the starting location for the second segment based on a prefix summed length of previous segments. That is, the GPU may determine the starting location for the second segment based on an accumulation of the lengths of the previous segments, i.e., the first segment. The GPU may also determine a third segment of the dashed line. Again, the GPU may determine the starting location for the third segment based on a prefix summed length of previous segments. That is, the GPU may determine the starting location for the third segment based on an accumulation of the lengths of the previous segments, i.e., the first segment and the second segment. The GPU may continue in this manner until the starting locations of each of the segments of the line have been determined.

In some examples, the dashed line may include visible segments and invisible segments. For example, GPU 12 may determine a color for segments that are visible (e.g., the dashes of the line) and discard segments that are invisible (e.g., the portion of the dashed line between the colored dashes). GPU 12 may determine whether to retain a segment (which may be interchangeably referred herein as a fragment, e.g., during pixel shading) based on a location of the segment being shaded. With respect to the three segments described above as an example, assume the first and third segments of the dashed line and the second segment is an invisible segment separating the first and third segments that is not colored. GPU 12 may determine whether to retain (e.g., shade with a color) or discard the segments during pixel shading based on the locations of the segments. That is, GPU 12 may determine that the first segment is retained based on the location of the first segment, determine that the second segment is discarded based on the location of the second segment, and determine that the third segment is retained based on the location of the third segment.

According to aspects of this disclosure, the GPU may apply the prefix summed length for each segment as a texture offset during rendering. For example, after rasterizing a segment, the GPU may feed the value of the prefix summed length for the segment to a pixel shader as a texture offset value. The GPU may apply the texture offset to the texture coordinates of the beginning of the line to determine the location of the segment being shaded.

FIG. 1 is a block diagram illustrating an example computing device 2 that may be used to implement the techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, patches, etc. In further examples, the graphics data to be rendered may include one or more path rendering primitives, such as, e.g., line segments, elliptic arcs, quadratic Bézier curves, and cubic Bézier curves.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from each of CPU 6, GPU 12, and memory 10, in other examples, some or all of the functionality of memory controller 8 may be implemented on one or more of CPU 6, GPU 12, and memory 10.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, stencil buffers, vertex buffers, frame buffers, or the like. In addition, memory 10 may store command streams for processing by GPU 12. For example, memory 10 may store path rendering commands, 3D graphics rendering commands, and/or general-purpose GPU computing commands. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM). Flash memory, a magnetic data media or an optical storage media.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. With respect to vector graphics, the rendered image data may include rendered fill areas and stroke areas for a path segment to be rendered. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

In some instances, GPU 12 may be configured to provide partial-to-total GPU based execution of various path rendering commands. For example, CPU 6 may issue one or more path rendering commands to GPU 12, and GPU 12 may execute the path rendering commands. As one example, CPU 6 may issue to GPU 12 one or more path filling commands that instruct GPU 12 to perform a path filling operation, and GPU 12 may execute the path filling commands. As another example, CPU 6 may issue to GPU 12 one or more path stroking commands that instruct GPU 12 to perform a path stroking operation, and GPU 12 may execute the path stroking commands.

In some examples, GPU 12 may be configured to receive data indicative of a path segment of a path to be rendered, tessellate the path segment into a plurality of primitives, and render at least one of a fill area and a stroke area for the path segment based on the plurality of primitives. The GPU may render a fill area for the path segment when performing a fill operation, and may render a stroke area for the path segment when performing a stroke operation. The plurality of primitives, in some examples, may be a plurality of line segments.

In some examples, GPU 12 may use a two-pass rendering approach to perform a path filling operation. For example, as part of a first rendering pass, GPU 12 may receive data indicative of a path segment of a path to be rendered, tessellate the path segment into a plurality of line segments, and generate a plurality of triangle primitives based on the plurality of line segments. GPU 12 may generate each of the plurality of triangle primitives based on a respective one of the plurality of line segments. GPU 12 may render each of the plurality of triangle primitives into a common stencil buffer such that the common stencil buffer stores data indicative of which pixels are inside of the fill area for the path segment. After rendering the primitives into the common stencil buffer, GPU 12 may perform a second rendering pass. During the second rendering pass, GPU 12 may render one or more primitives that encompass the pixels that are inside of the fill area for the path segment based on the data stored in the stencil buffer and a fill color in order to generate a rasterized version of the fill area for the path segment.

To generate the plurality of triangle primitives for the path filling operation, GPU 12 may, in some examples, generate a plurality of triangle primitives such that each of the triangle primitives has a common vertex that is the same for all of the triangle primitives generated for a path segment. In such examples, GPU 12 may generate the plurality of triangle primitives such that each of the triangle primitives has two additional vertices (i.e., two vertices in addition to the common vertex) that correspond to the endpoints of a respective one of the plurality of line segments. Each additional vertex may correspond to a respective one of the endpoints of a corresponding line segment.

Thus, when performing path rendering, GPU 12 may perform the following example functions to fill a path: tessellate the path into line segments, connect line segments to a pivot point to form triangle primitives, and render triangles to a stencil buffer. The next and possibly final steps of the filling process are to render a bounding box that encompasses the path (as described in greater detail, for example, with respect to FIG. 5C) with a stencil test enabled, and to copy the stencil contents to a frame buffer. In some instances, the bounding box may be determined based on commands received from CPU 6. As noted above, this approach requires two rendering passes and pre-processing of path to compute the bounding box.

In addition, when performing antialiasing such as MSAA, GPU 12 may sample the stencil buffer at the same rate as the render target. For example, if the stencil buffer and render target are both sampled at the MSAA rate, the memory bandwidth consumed when copying the stencil buffer to the frame buffer may be relatively large. If GPU 12 performs TIR and uses a relatively smaller allocation for the render target, the stencil sampling rate may also be impacted, thereby reducing the accuracy of the stencil buffer.

According to aspects of this disclosure, GPU 12 may perform stenciled TIR. For example, GPU 12 may determine a stencil parameter that indicates a sampling rate for determining a coverage value for each antialiased pixel of a path of an image. GPU 12 may also determine, separately from the stencil parameter, a render target parameter that indicates a memory allocation for each antialiased pixel of the path. GPU 12 may render the path using the stencil parameter and the render target parameter.

In some examples, GPU 12 may perform stenciling at a higher rate than the amount of memory that is allocated for pixels. For example, with respect to 16× MSAA, GPU 12 may perform stencil operations that are super-sampled, e.g., with each pixel having 16 samples. GPU 12 may render a given path by computing a coverage value per pixel based on the number of samples of the pixel that passed a stencil test (e.g., were determined to be inside the path). According to aspects of this disclosure, GPU 12 a render target for the pixels may be 1× sampled despite the stencil being 16× sampled.

In addition, according to aspects of this disclosure, GPU 12 may fill a path in a single rendering pass, without the need to pre-process a bounding box. For example, GPU 12 may determine a bounding box during stenciling operations. In this example, as GPU 12 renders primitives during stenciling (e.g., without shading the pixels), GPU 12 may determine the outermost points (e.g., outermost boundary points) of the primitives of the path. In some examples, GPU 12 may determine an upper point (at the relative top of the path), a lower point (at the relative bottom of the path), a right point (at the right-most point of the path), and a left point (at the left-most point of the path). GPU 12 may determine the bounding box using the outermost points determined during stenciling. That is, GPU 12 may determine a bounding box that encompasses all of the primitives of the path. In some examples, the bounding box may be composed of two triangles.

After completing the bounding box, GPU 12 may further process (e.g., in the same rendering pass) the bounding box by performing stenciled TIR on top of the bounding box. That is, as noted above, GPU 12 may determine a coverage value for each pixel and shade the pixels that GPU 12 determines are located within the stencil. In this example, GPU 12 need not perform a separate depth test on the pixels.

With respect to stroking, GPU 12 may in some instances dash a stroked path. That is, GPU 12 may determine a plurality of segments for a stoked path, such that the rendered path appears as a dashed line. Typically, GPU 12 may determine segments of the dashed path in order. For example, GPU 12 may receive commands from CPU 6 to render one segment before moving on to the next segment of the path. Such a process may deter parallelism (e.g., rasterizing and/or shading more than one segment in a particular time instance) and may prevent GPU 12 from independently rendering the path.

According to aspects of this disclosure, GPU 12 may determine the locations of each segment of the path (as well as the length of the path) and apply the length information during rendering. For example, GPU 12 may determine a texture offset for each segment of a plurality of ordered segments of a dashed line. In some instances, the segment order may be determined during geometry shading, as described in greater detail below. In this example, the texture offset for a current segment of the plurality of ordered segments may be based on an accumulation of lengths of segments that precede the current segment in the order. GPU 12 may also pixel shade the segments, including applying the texture offset to each segment to determine locations of the segments. For example, for example, GPU 12 may determine whether segments are visible or invisible based on the location of the segments. GPU 12 may retain (e.g., determine a color) for visible segments and discard segments of the dash that are not visible (e.g., the space between the visible dashes). In this way, GPU 12 may perform path rendering of a dashed line, e.g., without receiving dashing commands from CPU 6.

While described with respect to path rendering, the prefix sum operations described above are not limited to vector graphics. For example, the techniques for determining a prefix sum may be used in any application in which GPU 12 tracks an accumulated value. In an example for purposes of illustration, GPU 12 may perform the prefix sum operations described above when determining gradients. For example, in image processing, creating gradients may require accumulation of some length information to determine colors. In this example, GPU 12 may apply the prefix sum operations described above to determine the length information.

The rendering techniques described in this disclosure may be implemented in any of the components of computing device 2 illustrated in FIG. 1 including, e.g., CPU 6, GPU 12, and memory 10. In some examples, the path rendering techniques may be implemented completely or almost completely by GPU 12 (e.g., in a graphics pipeline of GPU 12 as described with respect to FIG. 3). In additional examples, CPU 6 may implement techniques for configuring the state of the graphics pipeline and binding shader programs to the graphics pipeline to implement a path rendering pipeline in GPU 12 that performs the path rendering techniques of this disclosure. In further examples, CPU 6 may be configured to place data indicative of a path to be rendered into one or more buffers (e.g., one or more vertex buffers) that may be accessed by GPU 12 to render one or more paths.

Figure 2:
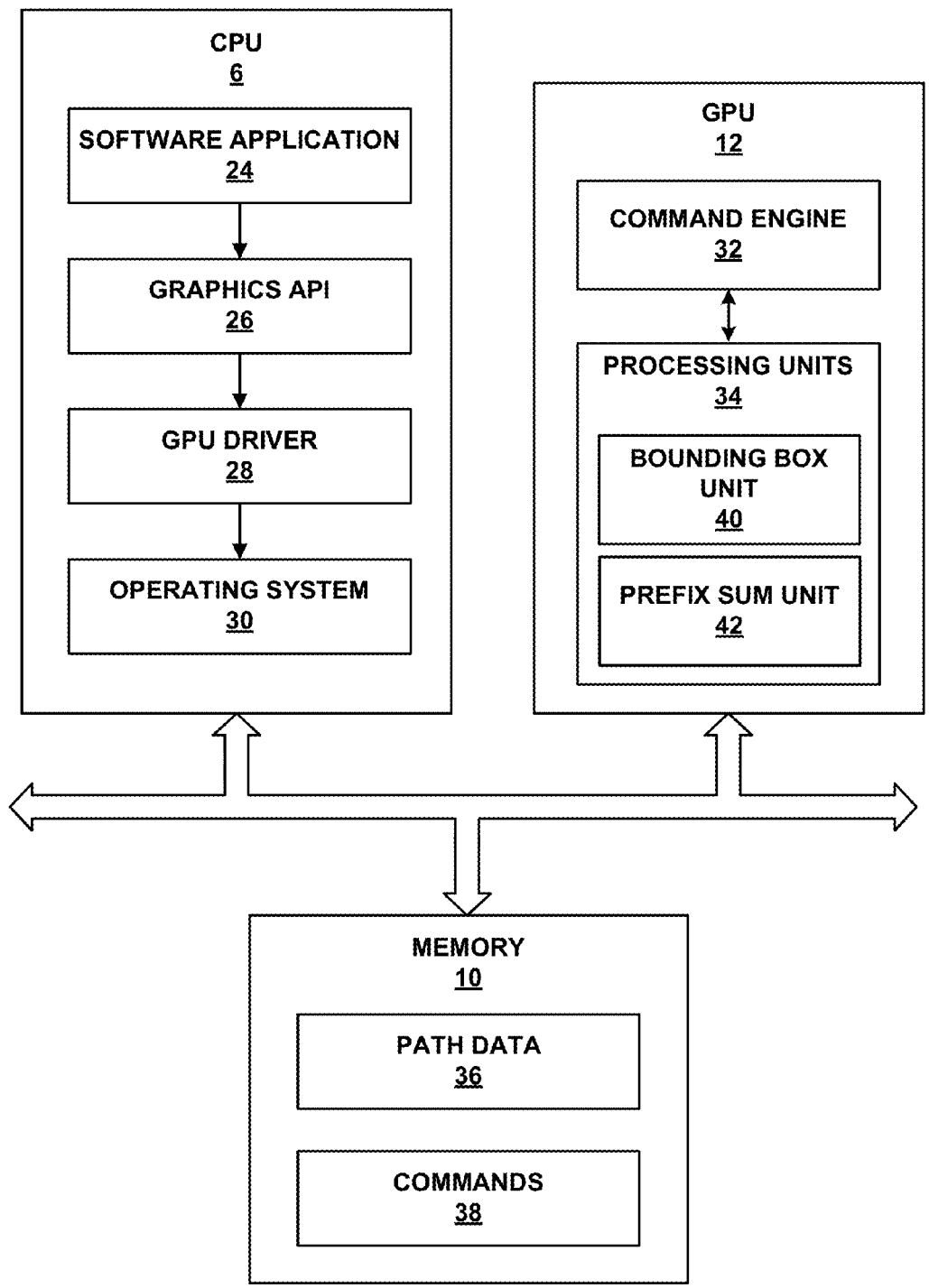
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6, forming a system on a chip (SoC).

CPU 6 is configured to execute a software application 24, a graphics API 26, a GPU driver 28 and an operating system 30. Software application 24 may include one or more instructions that cause graphics images to be displayed and/or one or more instructions that cause a non-graphics task (e.g., a general-purpose computing task) to be performed on GPU 12. Software application 24 may issue instructions to graphics API 26. Graphics API 26 may be a runtime service that translates the instructions received from software application 24 into a format that is consumable by GPU driver 28. GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

GPU 12 includes a command engine 32 and one or more processing units 34. In some examples, the one or more processing units 34 may form and/or implement a 3D graphics rendering pipeline, e.g., a DX 11 graphics rendering pipeline (i.e., a 3D graphics pipeline that is compliant with the DX 11 graphics API).

Command engine 32 is configured to receive commands from CPU 6 (e.g., via memory 10) and to cause GPU 12 to execute the commands. In response to receiving a state command, command engine 32 may be configured to set one or more state registers in GPU 12 to particular values based on the state command, and/or to configure one or more of the fixed-function processing units 34 based on the state command. In response to receiving a draw call command, command engine 32 may be configured to cause processing units 34 to render one or more path segments based on data that defines the geometry of the one or more path segments to be rendered and based on data indicative of the type of path segment for each of the path segments to be rendered. In some examples, the data that defines the geometry of the one or more path segments to be rendered and the data that defines the type of path segment for each of the path segments may be stored in one or more vertex data structures in memory 10. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, tessellation control shader units, tessellation evaluation shader units, compute shader units, and/or unified shader units. As shown in FIG. 2, processing units 34 also may include bounding box unit 40 and prefix sum unit.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

Memory 10 may store path data 36 and one or more commands 38. In some examples, path data 36 may be stored as a plurality of vertices (or control points) in one or more vertex buffers allocated in memory 10. In some examples, the path data may be stored in a patch list data structure (e.g., a four control point patch list). Commands 38 may be stored in one or more command buffers (e.g., a ring buffer). CPU 6 (e.g., GPU driver 28 via operating system 30) may place path data 36 and commands 38 into memory 10 for consumption by GPU 12. GPU 12 (e.g., command engine 32) may retrieve and execute commands 38 stored in memory 10.

In examples where path data 36 is stored as vertices (e.g., control points), the vertices may include one or more attributes that geometrically define a path segment to be rendered. For example, for a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc.

In some cases, the one or more attributes that geometrically define the path segment to be rendered may be resolution-independent. In other words, the attributes that geometrically define the path segment may be independent of the amount of tessellation to be performed when rendering the path segment and/or independent of the amount of vertices to be generated when rendering the path segment.

CPU 6 may also place data indicative of the type of path segment to be rendered (i.e., a "path segment type indicator") into one or more otherwise unused vertex attributes in the vertex buffer. In some examples, the different path segment types may correspond to a set of path segment types that are defined by a vector graphics API and are available for use by software application 24. In some examples, the different path segment types may correspond to a set of path segment types that are defined by the OpenVG API.

Commands 38 may include one or more state commands and/or one or more draw call commands. A state command may instruct GPU 12 to change one or more of the state variables in GPU 12, such as, e.g., the draw color, the fill color, the stroke color, etc. In some examples, the state commands may include path rendering state commands that are configured to set one or more state variables associated with rendering a path. For example, the state commands may include a paint mode command that is configured to indicate whether a path to be rendered is to be filled, stroked, or both. As another example, the state commands may include a fill color command that specifies a color to be used for filling operations and/or a stroke color command that specifies a color to be used for stroking operations. As a further example, the state commands may specify one or more parameters for the stroke operation, such as, e.g., a stroke width, an end cap style (e.g., round, square), a line join style (e.g., miter, round, bevel), a miter limit, etc. In some examples, in addition to or in lieu of using a state command to set one or more state parameters, one or more of the state parameters may be set by using a draw call command or by placing state indicators into a vertex buffer that contains path data 36.

A draw call command may instruct GPU 12 to render the geometry defined by a group of one or more vertices (e.g., defined in a vertex buffer) stored in memory 10. In some examples, the draw call command may invoke GPU 12 to render all of the vertices stored in a defined section (e.g., a vertex buffer or path data 36) of memory 10. In other words, once GPU 12 receives the draw call command, control is passed to GPU 12 for rendering the geometry and primitives represented by the vertices in the defined section (e.g., vertex buffer or path data 36) of memory 10.

The draw call commands may include one or both of 3D draw call commands and path rendering draw call commands. For 3D rendering draw call commands, the geometry defined by the group of one or more vertices in the vertex buffer may correspond to one or more 3D graphics primitives to be rendered (e.g., points, lines, triangles, quadralaterals, triangle strips, patches, etc.), and the 3D rendering draw call command may instruct GPU 12 to render the one or more 3D graphics primitives. For path rendering draw call commands, the geometry defined by the group of one or more vertices in the vertex buffer may correspond to one or more path primitives to be rendered (e.g., line segments, elliptic arcs, quadratic Bézier curves, and cubic Bézier curves, etc.), and the path rendering draw call command may instruct GPU 12 to render the one or more path primitives. In some examples, the path primitives capable of being rendered by GPU 12 may correspond to the different types of path segments described in this disclosure.

In some examples, the path rendering techniques described in this disclosure may be implemented in any of the components shown in FIG. 2 including, e.g., graphics API 26, GPU driver 28, command engine 32 and processing units 34. In further examples, all or almost all of the path rendering techniques may be implemented in a graphics pipeline in GPU 12 formed by processing units 34. In additional examples, software application 24, graphics API 26 and/or GPU driver 28 of CPU 6 may implement techniques for configuring the state of the graphics pipeline and binding shader programs to the graphics pipeline to implement a path rendering pipeline in GPU 12 that performs the path rendering techniques described in this disclosure. In further examples, software application 24, graphics API 26 and/or GPU driver 28 of CPU 6 may be configured to place data indicative of a path to be rendered into one or more buffers (e.g., one or more vertex buffers) that may be accessed by GPU 12 to render one or more paths.

According to aspects of this disclosure, processing units 34 include a bounding box unit 40. Bounding box unit 40 may include one or more programmable and/or fixed function units for determining a bounding box. For example, techniques of this disclosure include determining a bounding box and rendering the bounding box in a single rendering pass (as described in greater detail, for example, with respect to FIG. 3 below). When GPU 12 performs a path filing operation, bounding box unit 40 may be responsible for determining the boundaries of the path.

According to aspects of this disclosure, the bounding box unit 40 may be initiated using an API call. For example, graphics API 26 may include one or more instructions for triggering the use of bounding box unit 40 during rendering of a path. The API call may allow GPU 12 to skip shading of primitives until bounding box unit 40 has determined the bounding box. GPU 12 may then perform stenciled TIR on top of the bounding box, as noted above. In addition, by incorporating bounding box unit 40, GPU 12 may fill a path in a single pass without using a depth buffer.

Bounding box unit 40 may allow GPU 12 to fill paths without pre-processing a bounding box. For example, bounding box unit 40 may determine the bounding box using control polygons, e.g., at CPU 6. That is, bounding box unit 40 may determine the bounding box based on the boundaries of all of the generated primitives.

According to aspects of this disclosure, GPU 12 may be configured to skip shading of primitives until bounding box unit 40 has determined the bounding box. That is, during generation of the bounding box. GPU 12 may write primitives of the path to a stencil buffer of GPU 12 without shading the primitives. By incorporating bounding box unit 40. GPU 12 may fill a path in a single pass without using a depth buffer. For example, GPU 12 may perform stenciled TIR on top of the bounding box.

In an example for purposes of illustration, after GPU 12 has rasterized the bounding box determined by bounding box unit 40, GPU 12 may determine a coverage value for each pixel in the bounding box. In some examples, GPU 12 may determine the coverage values for quads of pixels (4 pixels at a time). In such examples, before forming a pixel wave for processing, GPU 12 may perform a stencil test on samples of each pixel of the quad. GPU 12 may update a coverage mask for each pixel based on the result of the test. This coverage value may be referred to as a stenciled_TIR attribute that GPU 12 may then use during shading. For example, an InputCoverage value for each pixel may be based on the stenciled_TIR. For example, GPU 12 may pixel shade (e.g., color) each pixel passing the stencil test (e.g., where a pixel passes the stencil test when more samples of the pixel are visible (shaded) than not). That is, GPU 12 may pass both a coverage mask (for centroid) and sample mask after stencil test (for InputCoverage) from a distributed processor (DProc) to a sampler.

According to some aspects of this disclosure, an API call may be used to support a stenciled TIR mode of rendering.

For example, graphics API 26 may include one or more instructions for triggering the use of stenciled TIR during rendering of a path. When stenciled TIR is active, a color buffer and a depth/stencil buffer (which may be allocated in a memory of GPU 12 and/or memory 10) may be different. For example, when performing MSAA, GPU 12 may render to a color buffer that is 1× MSAA and a stencil buffer that is 16×MSAA.

According to other aspects of this disclosure, processing units 34 also include a prefix sum unit 42 for rendering dashed segments, e.g., stroking a dashed path. Prefix sum unit 42 may determine a texture offset for each segment of a plurality of ordered segments of a dashed line. In some examples, a tessellation or geometry shader stage may determine the segment order when generating the segments. The texture offset for a current segment of the plurality of ordered segments may be based on an accumulation of lengths of segments that precede the current segment in the order. Prefix sum unit 42 may provide the texture offset to a shader stage, such as a pixel shader stage. The shader stage may apply the texture offset and render the segment in the appropriate location.

Accordingly, prefix sum unit 42 may include one or more programmable or fixed function units that accumulates the lengths of segments of a dashed line. In some examples, prefix sum unit 42 may be incorporated at a rasterizer stage. For example, GPU 12 may tessellate paths and a geometry shader stage may determine the path length. In other examples, the length may be determined by one or more other shader units. For example, according to aspects of this disclosure, prefix sum unit 42 may calculate a linelength value in a similar manner to a system interpreted value for the attribute pointsize (indicating a size of a point primitive). That is, linelength may be a system interpreted value indicating a location of a segment (also referred to as a fragment) in a dashed pattern.

When a pixel shader (e.g., as described with respect to FIG. 3 below) of GPU 12 receives the prefix summed linelength value, the pixel shader may determine a location of a fragment being shaded in a dash pattern. The pixel shader may then either retain the fragment (if it forms part of the visible dash) or discard the fragment (if it is not part of the visible dash) based on the determined location. In any case, prefix sum unit 42 may accumulate the length information as a prefix sum and provide the prefix sum as a texture offset to a downstream shader stage, such as a pixel shader.

During rendering, GPU 12 may send an event presum_start to a tessellation engine (TSE) (which may include a hull shader, a tessellator, and/or a domain shader, as described in greater detail with respect to FIG. 3 below) to reset a prefix_sum parameter. For each primitive, prefix sum unit 42 may add a scalar value (e.g., same field as pointsize) of the primitive to prefix_sum as new value. Prefix sum unit 42 may pass the old pre-fix sum value per pixel as texture offset.

In some examples, the tessellation engine may incorporate a register to accumulate prefix_sum parameter. Prefix sum unit 42 may reset the register by the event presum_start. The tessellation engine passes the prefix_sum as a per primitive attribute to render backend (RB) in the barycentric plane interface, similar to primitive faceness (which may be similar to sending a texture offset). In this example, an attribute may be added to the RB to provide a high level sequencer (HLSQ) with an interface to represent this per primitive attribute.

Figure 3:
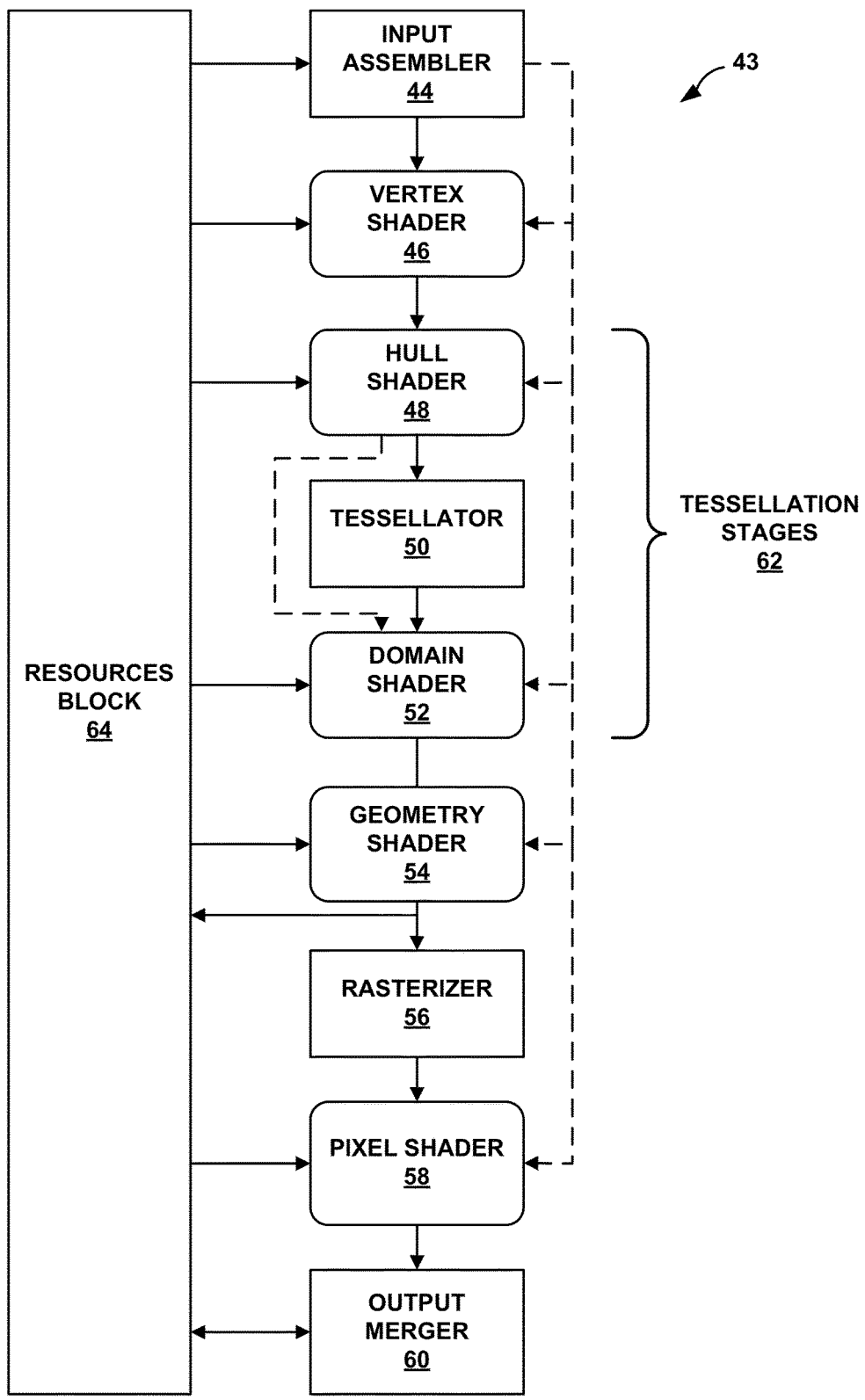
FIG. 3 is a conceptual diagram illustrating an example graphics pipeline that may be used to perform techniques of this disclosure.

FIG. 3 is a conceptual diagram illustrating an example graphics pipeline 43 that may perform the path rendering techniques of this disclosure. In some examples, the graphics pipeline may correspond to a Microsoft® DirectX (DX) 11 graphics pipeline. As shown in FIG. 3, graphics pipeline 43 includes a plurality of processing stages including an input assembler (IA) 44, a vertex shader (VS) 46, a hull shader (HS) 48, a tessellator 50, a domain shader (DS) 52, a geometry shader (GS) 54, a rasterizer 56, a pixel shader (PS) 58, and an output merger 60. Hull shader 48, tessellator 50, and domain shader 52 may form the tessellation stages 62 of graphics pipeline 43. In addition, pipeline 43 also includes resources block 64. In some examples, pipeline 43 may be implemented by and/or incorporated in GPU 12, as noted below.

Resources block 64 may correspond to one or more memory resources used by graphics pipeline 43, such as, e.g., one or more textures and/or one or more buffers. Resources block 64 may store input data to be processed by one or more of the processing stages in graphics pipeline 43 and/or output data from one or more of the processing stages in graphics pipeline 43. As one example, resources block 64 may store a stencil buffer used for performing a path filling operation as described in this disclosure. As another example, resources block 64 may store a frame buffer that holds a rasterized version of a fill area for a path segment and/or a rasterized version of a stroke area for a path segment as described in this disclosure. In some examples, the memory resources that form resources block 64 may reside in memory 10 and/or GPU cache 14 of computing device 2.

The processing stages depicted in FIG. 3 with straight corners represent fixed-function processing stages, and the processing stages depicted in FIG. 3 with rounded corners represent programmable processing stages. For example, as shown in FIG. 3, input assembler 44, tessellator 50, rasterizer 56 and output merger 60 are fixed-function processing stages, and vertex shader 46, hull shader 48, domain shader 52, geometry shader 54 and pixel shader 58 are programmable processing stages. Each of the programmable stages may be configured to execute a shader program of a particular type. For example, vertex shader 46 may be configured to execute a vertex shader program, hull shader 48 may be configured to execute a hull shader program, etc. Each of the different types of shader programs may execute either on a common shader unit of GPU 12 or on one or more dedicated shader units that are dedicated to executing shader programs of one or more particular types.

As shown in FIG. 3, input assembler 44, vertex shader 46, hull shader 48, domain shader 52, geometry shader 54, pixel shader 58 and output merger 60 are communicatively coupled to resources block 64. Input assembler 44, vertex shader 46, hull shader 48, domain shader 52, geometry shader 54, pixel shader 58 and output merger 60 are configured to retrieve and/or to receive input data from resources block 64. Geometry shader 54 and output merger 60 are configured to write output data to resources block 64. The above-described configuration of communication between the processing stages in graphics pipeline 43 and resources block 64 is merely one example of how the communication may be configured between the processing stages of graphics pipeline 43 and resources block 64. In other examples, more or less unidirectional and/or bi-directional communication channels may be provided between the processing stages of graphics pipeline 43 and resources block 64.

Additional background information regarding the general operation of the DirectX 11 graphics pipeline may be found at http://msdn.microsoft.com/en-us/library/windows/desktop/ff476882%28v=vs.85%29.aspx. Further information regarding the general operation of the DirectX 11 graphics pipeline may be found in Zink et al., "Practical Rendering & Computation with Direct3D 11," CRC Press (2011).

Two main path rendering operations may include: (1) filling a path segment; and (2) stroking a path segment. In some instances, the filling operation may utilize a two-pass approach that may generally involve the following steps:

Pass 1
1. Tessellate a path segment into a plurality of line segments.
2. Generate a triangle primitive for every line segment.
3. Render all of the triangle primitives into a stencil buffer.

Pass2
4. Render a bounding box for the path segment using the stencil buffer.

For the first pass, CPU 6 may place data indicative of a path segment to be rendered into one or more vertices of a vertex buffer. In some examples, the vertex buffer may correspond to path data 36 shown in FIG. 2. The primitive topology for the vertices in the vertex buffer may be, in some examples, a patch control list. For a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points that define the curve instead of four control points. For elliptic arcs, the vertices in the patch control list may include data indicative of an endpoint parameterization of the elliptic arc or data indicative of a center parameterization of the elliptic arc. CPU 6 may also place data indicative of the type of path segment to be rendered into an otherwise unused vertex attribute of the patch control list.

One example format for the path data 36 received and used by GPU 12 to perform path rendering will now be described. It should be understood that this is merely one example of how data indicative of a path to be rendered and/or a path segment to be rendered may be provided by CPU 6 to GPU 12 and that other examples are possible and within the scope of this disclosure. In this example, GPU 12 receives each path segment as a four (4) control point patch list primitive. Each of the vertices (e.g., control points) in the patch list, in this example, includes three (3) float attributes that define attributes for the respective vertex (e.g., control point).

For a line path segment, the input path data may take the following form or a similar form:
{XMFLOAT3(X0, Y0, 2.0f)},
{XMFLOAT3(X1, Y1, 1.0f)},
{XMFLOAT3(0.0f, 0.0f, 1.0f)},
{XMFLOAT3(0.0f, 0.0f, 1.0f)}, In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 2.0f, which means that the path segment is a line path segment. X0, Y0, X1, Y1 are the coordinates for the endpoints of the line path segment where (X0, Y0) represents a first endpoint and (X1, Y1) represents a second endpoint.

The remaining vertices and attributes in this example may be unused and/or may be used to indicate other attributes for the path segment. Other attributes for the path segment may include, e.g., whether the path segment is the beginning or end of an open path, whether the path segment should be displayed for the path, whether an endcap should be placed on either end of the path segment, what type of endcap should be used if any, whether a join should be placed on either end of the path segment, and what type of join to use if any.

The input path data for a cubic Bézier path segment may take the following form or a similar form:
{XMFLOAT3(X0, Y0, 3.0f)},
{XMFLOAT3(X1, Y1, 1.0f)},
{XMFLOAT3(X2, Y2, 1.0f)},
{XMFLOAT3(X3, Y3, 1.0f)}, In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 3.0f, which means that the path segment is a cubic Bézier path segment. X0-X3 and Y0-Y3 are the coordinates of the control points for the cubic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may include, in some examples, attributes similar to those described above with respect to the line path segment.

Similar input may be used for a quadratic Bézier path segment except that three control points may be provided instead of four control points, and the path segment type indicator may be different to distinguish the primitive from a cubic Bézier path segment.

For example, the input path data for a quadratic Bézier path segment may take the following form or a similar form:
{XMFLOAT3(X0, Y0, 1.0f)},
{XMFLOAT3(X1, Y1, 1.0f)},
{XMFLOAT3(X2, Y2, 1.0f)},
{XMFLOAT3(0.0f, 0.0f, 1.0f)}, In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 1.0f, which means that the path segment is a quadratic Bézier path segment. X0-X2 and Y0-Y2 are the coordinates of the control points for the quadratic Bézier path segment where (X0, Y0) represents a first control point, (X1, Y1) represents a second control point, etc. The remaining vertices and attributes in this example may be unused and/or may be used to indicate other attributes for the path segment. The other attributes for the path segment may include, in some examples, attributes similar to those described above with respect to the line path segment.

In some examples, the input path data for an elliptic arc path segment may include data indicative of a center parameterization of the elliptic arc path segment. For example, the input path data for an elliptic arc path segment may take the following form or a similar form:

{XMFLOAT3(X0, Y0, 4.0f)},
{XMFLOAT3(X1, Y1, 1.0f)},
{XMFLOAT3(c.x, c.y, 1.0f)},
{XMFLOAT3(theta0, theta1, angle)}, In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). The path segment type indicator, in this example, may be any of 4.0, 4.1, 4.2 or 4.3 corresponding, respectively, to a large clockwise (LCW) elliptic arc, a large counter-clockwise (LCCW) elliptic arc, a small clockwise (SCW) elliptic arc, and a small counter-clockwise (SCCW) elliptic are. X0, X1 and Y0, Y1 are endpoint coordinates of the elliptic arc path segment where (X0, Y0) represents an initial endpoint of the arc and (X1, Y1) represents a final endpoint of the arc. In addition, theta0 represents the angle of the initial point of the elliptic arc (as measured on an unsealed circle), and theta1 represents the angle of the final point of the elliptic arc (as measured on an unsealed circle). Notably, even though the example input data form specified above is a center parameterization, the input data form may still include coordinates for the initial and final endpoints of the arc (i.e., (X0, Y0), (X1, Y1)). Such coordinates may be used, in some examples, to ensure water-tightness of the resulting geometry.

In further examples, the input path data for an elliptic arc path segment may include data indicative of an endpoint parameterization of the elliptic arc path segment. For example, the input path data for an elliptic arc path segment may take the following form or a similar form:

{XMFLOAT3(X0, Y0, 4.0f)},
{XMFLOAT3(X1, Y1, 1.0f)},
{XMFLOAT3(rH, rV, 1.0f)},
{XMFLOAT3(angle, 0.0f, 1.0f)}, In this example, each row represents a vertex or control point of a four control point patch list, and each parameter in the parentheses represents an attribute of a respective vertex or control point. The last attribute of the first control point, in this example, stores data indicative of the type of path segment to be rendered (i.e., a "path segment type indicator"). The path segment type indicator, in this example may be any of 4.0, 4.1, 4.2 or 4.3 corresponding, respectively, to a large clockwise (LCW) elliptic arc, a large counter-clockwise (LCCW) elliptic arc, a small clockwise (SCW) elliptic arc, and a small counter-clockwise (SCCW) elliptic are. X0, X1 and Y0, Y1 are endpoint coordinates of the elliptic arc path segment where (X0, Y0) represents an initial endpoint of the arc and (X1, Y1) represents a final endpoint of the arc. In addition, angle represents the counter-clockwise rotation angle of the ellipse relative to the x axis measured prior to scaling by (rh, rv).

In examples where the input path data includes an elliptic arc represented in an endpoint parametric form, CPU 6 may, in some examples, convert the representation of the elliptic arc from an endpoint parametric form into a center parametric form prior to sending data indicative of the elliptic arc to GPU 12 for rendering. For example, CPU 6 may generate a center parameterization of an elliptic arc based on an endpoint parameterization of the elliptic arc, and send the center parameterization of the elliptic arc to GPU 12. The center parameterization for the elliptic arc may conform to the example input data form specified above. The center parameterization may be used by CPU 6 to find the endpoint tangents and/or normals for the elliptic arc, which may in turn be used by CPU 6 to generate join primitives for rendering by GPU 12.

In some examples, stroking operations may use three additional fields of the vertex path data input to handle endcaps, joins and open paths. For example, certain vertex coordinates may store data indicative of whether the path segment is the beginning of an open path, the end of an open path, and whether the path segment may be dropped (e.g., the path segment is the closing path segment of an open path). The following is an example template that includes the above-described vertex attributes:

{XMFLOAT3(X0, Y0, 2.0f)},
{XMFLOAT3(X1, Y1, 2.0f)},
{XMFLOAT3(0.0f, 0.0f, 2.0f)},
{XMFLOAT3(0.0f, 0.0f, 2.0f)},

In this template, a 2.0f on the z coordinate (i.e. third coordinate or attribute) of the second vertex indicates that the path segment is the beginning of an open path and may signal to GPU 12 to put an endcap (i.e., a startcap) at the beginning of the path segment. A 2.0f on the z coordinate of the third vertex indicates that the path segment is the ending of an open path and may signal to GPU 12 to put an endcap at the end of the path segment. A 2.0f on the z coordinate of the last vertex indicates that the current primitive is to be dropped (e.g., it is the closing line or path segment of an open path).

To perform a path filling operation, input assembler 44 obtains path data 36 from memory 10, and passes the path data onto one or more subsequent stages of graphics pipeline 43 to render the path segments (e.g., path primitives) specified by path data 36. For example, input assembler 44 may obtain a plurality of vertices from a vertex buffer stored in memory 10 and cause vertex shader 46 to process the vertices. In some examples, input assembler 44 may pass the vertices to be processed directly to vertex shader 46. In additional examples, input assembler 44 may direct vertex shader 46 to retrieve particular vertices for processing from a vertex buffer in resources block 64.

Vertex shader 46 is configured to process vertices received from input assembler 44 and/or resources block 64 and to generate an output vertex for each input vertex processed by vertex shader 46. For example, for each input vertex, vertex shader 46 may execute an instance of a vertex shader program on a shader unit of GPU 12. In some examples, vertex shader 46 may execute a "pass-through" vertex shader program for each input vertex. The "pass-through" vertex shader program may cause vertex shader 46 to, for each input vertex, output a vertex that corresponds to the input vertex. In this case, an output vertex may correspond to an input vertex if the output vertex has the same attributes as the input vertex. To implement the "pass-through" vertex shader program, in some examples, vertex shader 46 may apply an identity transformation to each input vertex to generate an output vertex with the same attributes. The input vertices received by vertex shader 46 and the output vertices generated by vertex shader 46 may be alternatively referred to as input control points and output control points, respectively.

In further examples, vertex shader 46 may generate one or more output attributes for an output vertex that are not identical to the input attributes of a corresponding input vertex. For example, vertex shader 46 may perform substantive processing on one or more of the attributes of the input vertices to generate one or more attributes for the output vertices. As one example, vertex shader 46 may perform one or more of a world transformation, a view transformation, a projection transformation, or any combination thereof on the positional attributes of the input vertices to generate one or more attributes for the output vertices. As another example, vertex shader 46 may add and/or delete attributes from the set of input attributes to generate a set of output attributes for an output vertex.

Tessellation stages 62 (i.e., hull shader 48, tessellator 50, and domain shader 52) may form a tessellation engine and may tessellate a path segment defined by the input path data into a plurality of line segments. The plurality of line segments may approximate the curvature of the path segment to be rendered. In general, hull shader 48 may pass the control points received from vertex shader 46 to domain shader 52 for further processing, and provide configuration data to tessellator 50. Tessellator 50 may determine values at which one or more parametric equations that represent a particular type of path segment should be evaluated. Domain shader 52 may evaluate the parametric equations at the values determined by tessellator 50, and output a vertex for each evaluation. In some examples, each of the vertices output by domain shader 52 may include one or more attributes that are indicative of the position of the vertex. In additional examples, each of the vertices output by domain shader 52 may include one or more attributes that are indicative of the type of path rendering primitive associated with the vertex.

In some examples, hull shader 48 may process the control points received from vertex shader 46 and/or resources block 64 and may generate an output control point for each instance of the hull shader program executed by hull shader 48. For example, for each output control point to be generated by hull shader 48, hull shader 48 may execute an instance of a hull shader program on a shader unit of GPU 12. In some examples, hull shader 48 may execute a "pass-through" hull shader program for each output control point. The "pass-through" hull shader program may cause hull shader 48 to, for each output control point, output a control point that corresponds to a respective one of the input control points. In this case, an output control point may correspond to an input control point if the output control point has the same attributes as the input control point.

In further examples, hull shader 48 may generate one or more output attributes for an output control point that are not identical to the input attributes of a respective one of the input control points. For example, hull shader 48 may perform substantive processing on one or more of the attributes of the input control points to generate one or more attributes for the output control points. As another example, hull shader 48 may add and/or delete attributes from a set of input attributes to generate the set of output attributes for an output control point. In some examples, if GPU 12 receives path data for an elliptic arc that is in the form of an endpoint parameterization, hull shader 48 may convert the endpoint parameterization of the elliptic arc into a center parameterization for the elliptic arc as described in further detail below.

In additional examples, hull shader 48 may drop primitives that are not to be rendered for a particular rendering operation. Dropping a primitive may refer to the process of causing data corresponding to the primitive to not be passed on to further stages of graphics pipeline 43, thereby effectively causing such a primitive to not be rendered by the remainder of the pipeline. For example, when graphics pipeline 43 is performing a filling operation, hull shader 48 may drop join primitives and cap primitives. As another example, when graphics pipeline 43 is performing a stroking operation, hull shader 48 may drop close-path primitives for open paths. A closed-path primitive may refer to a primitive that represents a line path segment that closes a loop. A close-path primitive is typically used for paths that are closed paths rather than open paths. In some examples, a close-path primitive may be identified by a different primitive type identifier than the primitive type identifier used for identifying other line path segments in a path. For example, a close path primitive may be identified by a primitive type identifier of 2.1 f instead of 2.0f.

Hull shader 48 may also execute an instance of a patch constant function for each path segment. The patch constant function may determine and provide configuration parameters to tessellator 50 to be used by tessellator 50 when generating output values. For example, the patch constant function may cause hull shader 48 to provide tessellation factors to tessellator 50. The tessellation factors may specify a degree of tessellation that tessellator 50 is to apply to a particular tessellation domain (e.g., how finely the domain should be subdivided and/or the number of smaller objects into which the domain should be subdivided). In some examples, hull shader 48 may cause tessellator 50 to perform 4× tessellation for cubic Bézier curves, 4× tessellation for round joins and caps, and 1× tessellation for line segments.

As another example, the patch constant function may cause hull shader 48 to provide a type of tessellation domain to be used during tessellation to tessellator 50. A tessellation domain may refer to an object that is used by tessellator 50 to generate a plurality of coordinates for use by domain shader 52. Conceptually, the tessellation domain may correspond to an object that is subdivided by tessellator 50 into a plurality of smaller objects. The positional coordinates of the vertices of the smaller objects are then sent to domain shader 52 for further processing. In some examples, the type of tessellation domain may be selected to be one of a quad, a tri, and an isoline. The smaller objects into which the domain is subdivided, in some examples, may correspond to triangles, line segments, or points. In some examples, hull shader 48 may specify an isoline tessellation domain type and specify that tessellator 50 should subdivide the isoline domain into line segments.

Tessellator 50 may generate a plurality of output values for each path segment processed by tessellation stages 62. The output values may determine the values at which one or more parametric equations that represent a particular type of path segment should be evaluated by domain shader 52. In some examples, tessellator 50 may generate the plurality of output values based on one or more tessellation factors and/or a tessellation domain type provided to tessellator 50 by hull shader 48. For example, tessellator 50 may subdivide an isoline into a plurality of line segments, and generate an output value for each endpoint of the plurality of line segments in a normalized coordinate system.

Domain shader 52 may receive output values from tessellator 50 and control points for a path segment from hull shader 48, and generate output vertices that correspond to a plurality of tessellated line segments that approximate the curvature and/or shape of a path segment. For example, for each of the output values received from tessellator 50, domain shader 52 may execute an instance of a domain shader program on a shader unit of GPU 12. The domain shader program may cause domain shader 52 to, for each of the output values received from tessellator 50, evaluate one or more parametric equations at a particular value that is determined based on the respective output value to generate positional coordinates for an output vertex that corresponds to the respective output value. One or more of the coefficients of the parametric equations used to generate the output vertex coordinates may be defined based on one or more of the control points received from hull shader 48. Each output vertex may correspond to an endpoint of one of the plurality of tessellated line segments. Two consecutive output vertices may correspond to the endpoints of a single tessellated line segment.

In additional examples, the domain shader program may cause domain shader 52 to generate normal coordinates for output vertices that correspond to each of the output values received from tessellator 50. For example, the domain shader program may cause domain shader 52 to, for each of the output values received from tessellator 50, evaluate one or more additional parametric equations at a particular value that is determined based on the respective output value in order to generate tangent coordinates for an output vertex that corresponds to the respective output value. The tangent coordinates for an output vertex may be indicative of a direction of a tangent line of the path segment that intersects the path segment at the output vertex. Domain shader 52 may generate normal coordinates for each of the output vertices based on the tangent coordinates that correspond to the respective output vertex. The normal coordinates generated for a particular output vertex may be indicative of a normal vector that indicates a direction which is perpendicular to a tangent of the path segment that intersects the path segment at the output vertex.

In some examples, when graphics pipeline 43 is performing a filling operation, domain shader 52 may generate vertices corresponding to the locations of the endpoints of the tessellated line segments without generating any normals for such locations. In such examples, when graphics pipeline 43 is performing a stroking operation, domain shader 52 may, in some examples, generate vertices corresponding to the locations of the endpoints of the tessellated line segments and generate normals corresponding to such locations.

Domain shader 52 may output the vertices in an ordered sequence where each set of adjacent vertices represents a tessellated line segment. The line segments may collectively approximate the path segment that was defined in the vertex buffer. For example, domain shader 52 may output the following set of vertices {0, 1, 2, 3, 4, 5} that define the following line segments: {0, 1}, {1, 2}, {2, 3}, {3, 4}, {4, 5}. In additional examples, domain shader 52 may output the following set of vertices {0, 1, 1, 2, 2, 3, 3, 4, 4, 5} that may define the same line segments as listed in the previous example.

In some examples, tessellator 50 and domain shader 52 may be configured to uniformly tessellate a path segment into a plurality of line segments according to the following technique. Specifically, tessellator 50 may output coordinates for parametric evaluation (e.g., t=0/T, 1/T, 2/T . . . T/T, where T is the tessellation factor). Depending on the type of primitive, domain shader 52 may evaluate one or more parametric equations at the values that are output by tessellator 50.

Geometry shader 54 may receive tessellated line segments from domain shader 52 and generate a plurality of primitives based on the tessellated line segments. In this manner, geometry shader 54 may determine a segment order for line segments. For each of the tessellated line segments, geometry shader 54 may execute an instance of a geometry shader program on a shader unit of GPU 12, and generate a triangle primitive for the tessellated line segment based on the respective tessellated line segment. In some examples, for each of the tessellated line segments, geometry shader 54 may receive two vertices from domain shader 52 that correspond to the respective tessellated line segment, and generate a set of three vertices that correspond to a triangle primitive.

In some examples, two of the vertices of the triangle primitive may be the same vertices (e.g., have the same positional coordinates) as the two received vertices. In such examples, geometry shader 54 may generate the third vertex based on a common vertex that is common for all tessellated line segments associated with a path segment to be rendered. The common vertex may or may not correspond to one of the endpoints of the tessellated line segments. In some examples, the common vertex may correspond to the first vertex in a set of vertices that correspond to the tessellated line segments for a path segment to be rendered.

Geometry shader 54 may be invoked once for each of the tessellated line segments produced by domain shader 52. For each of the tessellated line segments, geometry shader 54 may generate a triangle primitive using a common control point as a first vertex of the triangle and using the two endpoints of the respective tessellated line segment as the second and third vertices of the triangle. For example, an example was provided above where domain shader 52 generated the following set of vertices {0, 1, 2, 3, 4, 5} that define the following line segments: {0, 1}, {1, 2}, {2, 3}, {3, 4}, {4, 5}. For the above-listed sequence of line segments, geometry shader 54 may generate the following triangles: {C, 0, 1}, {C, 1, 2}, {C, 2, 3}, {C, 3, 4}, {C, 4, 5}, {C, 4, 5} where C is any single vertex that is common to all of the triangles.

Rasterizer 56 may be configured to convert a plurality of 3D graphics primitives (e.g., points, lines, and triangles) into a plurality of pixels that correspond to the 3D graphics primitives. For example, rasterizer 56 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle.

Pixel shader 58 may receive pixels from rasterizer 56, and generate shaded pixels based on the received pixels according to a pixel shader program. For example, for each pixel received from rasterizer 56, pixel shader 58 may execute an instance of a pixel shader program on a shader unit of GPU 12. In some examples, pixel shader 58 may execute a "pass-through" pixel shader program for each pixel. The "pass-through" pixel shader program may cause pixel shader 58 to, for each pixel, output a pixel that corresponds to a respective one of the input pixel. In this case, an output pixel may correspond to an input pixel if the output pixel has the same attributes as the input pixel.

In further examples, pixel shader 58 may generate one or more output attributes for an output pixel that are not identical to the input attributes of a respective one of the input pixels. For example, pixel shader 58 may perform substantive processing on one or more of the attributes of an input pixel to generate one or more attributes for an output pixel. As another example, pixel shader 58 may add and/or delete attributes from a set of input attributes to generate the set of output attributes for an output pixel.

Output merger 60 may place pixel data received from pixel shader 58 into a render target (e.g., a frame buffer or a stencil buffer). In some examples, output merger 60 may merge the pixel data received from pixel shader 58 with the pixel data already stored in a render target based on a raster operation.

To perform the path filling operation, rasterizer 56 may rasterize each of the triangles received by geometry shader 54 into a common stencil buffer (e.g., a buffer stored in resources block 64). During the first pass, pixel shader 58 may be disabled or set to a "pass-through" mode to pass input pixels directly to output merger 60. Output merger 60 may be configured to populate the stencil buffer such that the stencil buffer stores values which are indicative of a fill area for the path segment according to one or more stencil buffer filling techniques.

According to aspects of this disclosure, as noted above, GPU 12 may perform a filling operation using a single pass approach using stenciled TIR and a bounding box that involves the following steps:
1. Tessellate a path segment into a plurality of line segments.
2. Generate a triangle primitive for every line segment.
3. Render all of the triangle primitives into a stencil buffer.
4. Determine bounding box during stenciling.
5. Render bounding box with stenciled TIR.

In the example above, GPU 12 may send an event (e.g., bb_start) to tessellation stages 62 (also referred to herein as a tessellation engine) indicating that the bounding box parameters (e.g., bb_box) should be reset. GPU 12 may then generate the triangle primitives while updating the stencil buffer using the process described above. In addition, tessellation stages 62 update the bounding box parameters (bb_box) by comparing min-max parameters with vertices data. That is, tessellation stages 62 may check each of the vertices to determine whether a vertex has a location that is located further above, below, to the right, or to the left of any previously determined vertices, e.g., using Cartesian coordinates. If the vertex is positioned at an outermost location relative to the other vertices, tessellation stages 62 may update the bounding box parameters (bb_box).

When tessellation stages 62 receive a bounding box end event (e.g., bb_end), the tessellation stages may generate a rectlist corresponding to the determined bounding box coordinates, e.g., form the bounding box that encompasses the triangle primitives of the path. Rasterizer 56 may then rasterize the bounding box. According to aspects of this disclosure, rasterizer 56 may perform stenciled TIR, in which the stenciled pixels are super-sampled relative to the render target and pixel shader 58 only shades stenciled pixels. As pixel shader 58 shades pixels, the stencil value for the pixels may be cleared from the stencil buffer.

Accordingly, in the example described above, tessellation stages 62 maintain an accumulation of bounding box parameters (bb_box) between a bounding box start event (bb_start) and a bounding box end event (bb_end). The render backend (e.g., including geometry shader 54, rasterizer 56, pixel shader 58 and/or output merger 60) expects the fixed operations between the bounding box start event (bb_start) and a bounding box end event (bb_end). That is, the render backend may perform the operations associated with determining the bounding box without a driver (such as GPU driver 28 (FIG. 2)) programming the render backend registers, which may be allocated in resources block 64. While described with respect to tessellation stages 62, it should be understood that the techniques above may be carried out by one or more other stages of the graphics pipeline. In this way, GPU 12 may use graphics pipeline 43 to fill a path in a single pass and without the need to render a bounding box during a separate pass.

According to other aspects of this disclosure, graphics pipeline 43 may be configured to perform dashing for a stroked path segment. In an example for purposes of illustration, geometry shader 54 may receive tessellated line segments from domain shader 52 and generate a plurality of primitives based on the tessellated line segments. The plurality of primitives may include the dash segments to be shaded and the plurality of primitives may be in a particular order, e.g., a segment order. Geometry shader 54 (or another component of graphics pipeline 43) may also determine the length of each of the dashes.

In addition, geometry shader 54 accumulates the length of the dashes as each dash is generated and assigns each dash segment a prefix sum of the lengths of previous dash segments, e.g., dash segments that precede the current segment in the segment order. For example, the first dash segment may be assigned a prefix sum of zero, the second dash segment may be assigned a prefix sum of the length first dash segment, the third dash segment may be assigned a prefix sum of the length of a combination of the first and second dash segments, and so on.

Rasterizer 56 typically receives the dash segments and follows a primitive order during rasterization, where the primitive order refers to an order for rendering. After rasterization, the prefix sum for each dash segment may be sent to the pixel shader 58 for use when shading the dash segments. For example, in order to shade the dash segments in the appropriate location, pixel shader 58 may apply the prefix sum for each dash segment as a texture offset. The texture offset indicates the location of the previous dash segments, thereby allowing pixel shader 58 to shade the next dash segment in the appropriate location relative to the previous segments.

Figure 4:
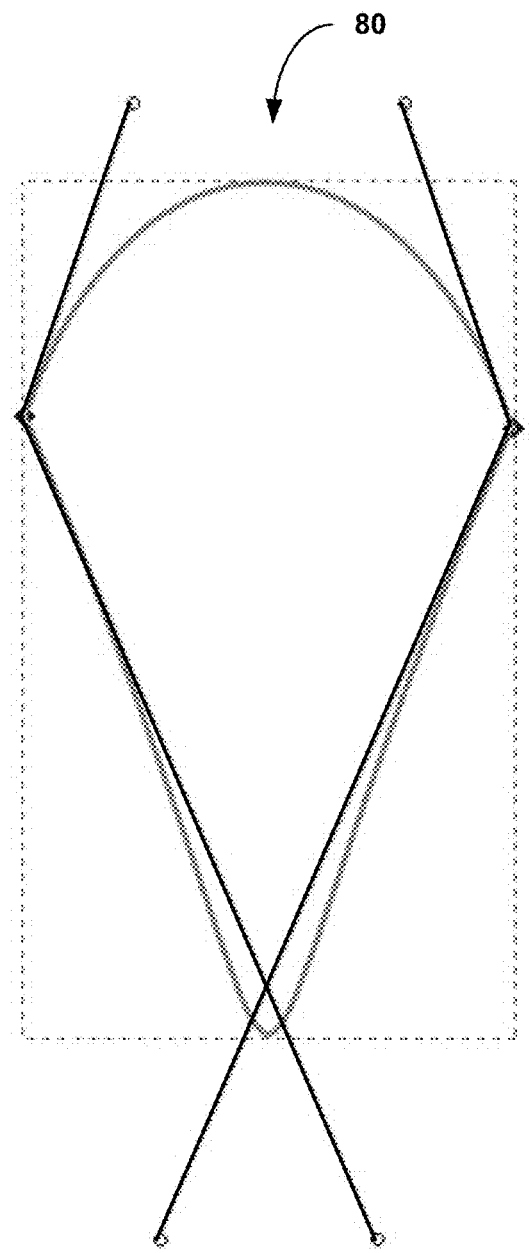
FIG. 4 is a diagram of an example path to be rendered.

FIG. 4 is a diagram of an example path 80 to be rendered. For example, path 80 represents an "ice cream cone" shape with a rounded top and an elongated bottom. Path 80 may be a closed path consisting of two cubics. Segments may be packed into patch4 prims (primitives). For example, the input path data for path 80 may take the following form or a similar form:
{XMFLOAT4(0.0f, 0.0f, CUBIC, 0.0f)},
{XMFLOAT4(0.4f, 1.2f, 0.0f, 0.0f)},
{XMFLOAT4(1.4f, 1.2f, 0.0f, 0.0f)},
{XMFLOAT4(1.8f, 0.0f, 0.0f, 0.0f)},
{XMFLOAT4(1.8f, 0.0f, CUBIC, 0.0f)},
{XMFLOAT4(0.5f,−3.0f, 0.0f, 0.0f)},
{XMFLOAT4(1.3f,−3.0f, 0.0f, 0.0f)},
{XMFLOAT4(0.0f, 0.0f, 0.0f, 0.0f)}

In this example, each row represents a vertex or control point and each parameter in the parentheses represents an attribute of a respective vertex or control point. The last attribute of the first control point, in this example, stores data indicative of the type of path segment to be rendered (i.e., a "path segment type indicator"). Specifically, the path segment type indicator in this example is 0.0f, which means that the path segment is a cubic Bézier path segment. The other attributes for the path segment may include, in some examples, attributes similar to those described above with respect to the line path segment.

Figure 5A:
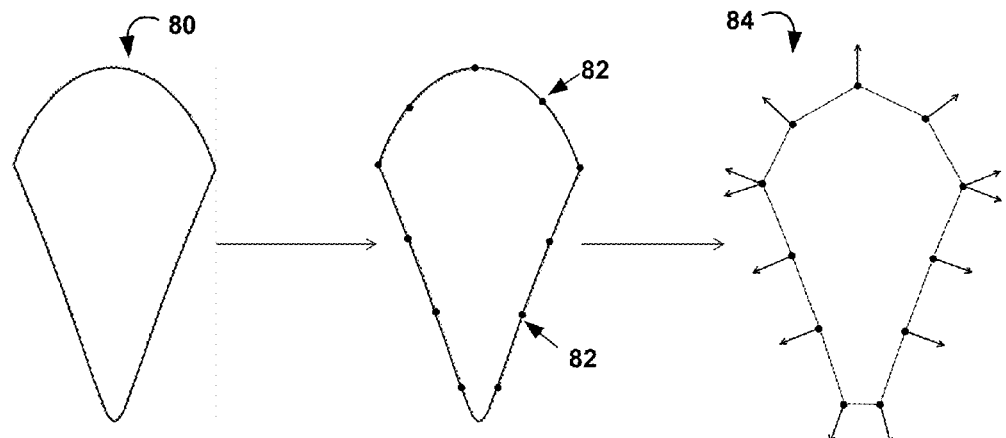
FIGS. 5A-5C are diagrams illustrating an example sequence of filling operations for the path shown in FIG. 4.
Figure 5B:
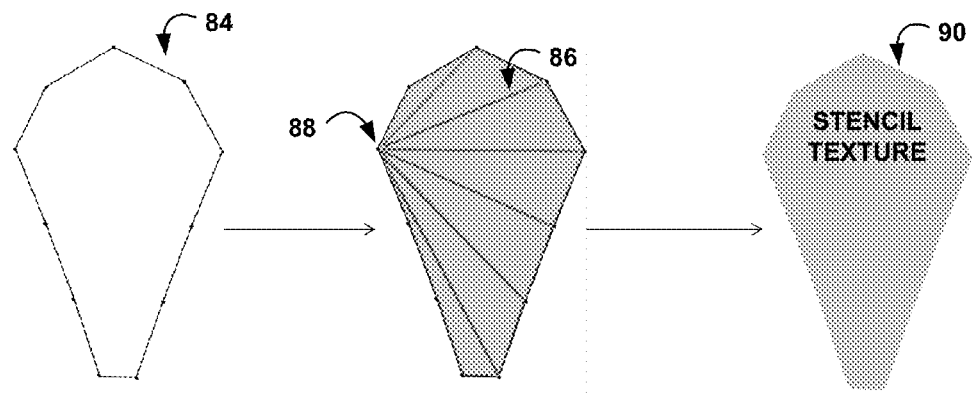
Figure 5C:
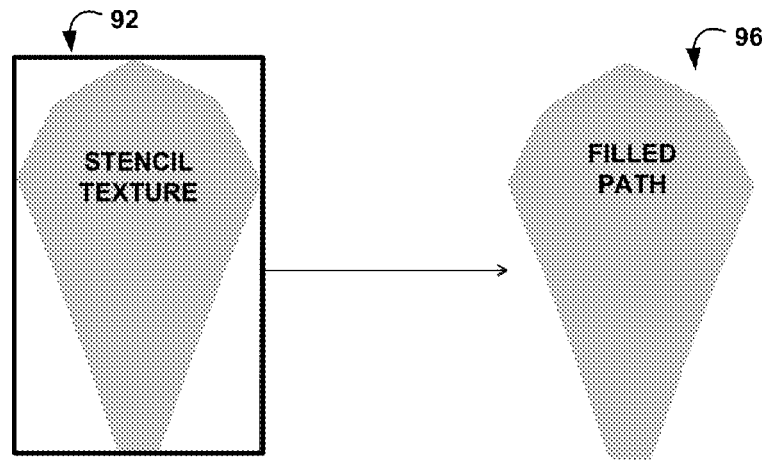

FIGS. 5A-5C are a sequence of diagrams illustrating an example filling operation for path 80 shown in FIG. 4. Path 80 is under tessellated (e.g., has fewer segments than typical) in the example of FIGS. 5A-5C for purposes of illustration. In addition, while described with respect to GPU 12 for purposes of explanation, the process carried out in FIGS. 5A-5C may be performed by a variety of other processors.

As shown in FIG. 5A, GPU 12 tessellates path 80 to include a number of vertices 82 that are connected in a linestrip fashion 84. As shown in FIG. 5B, GPU 12 generates a number of line segments 86 that are connected to a pivot point 88 to form a number of triangle primitives. In the example of FIG. 5B, the relative first vertex of path 80 is used as pivot point 88. The winding order of the triangles will determine the appropriate stencil operation. For example, every generated line segment is connected to pivot point 88. The resulting orientation of the triangle (e.g., clockwise or counterclockwise) may determine the winding order of the triangle primitives. The winding order may affect the stencil value in different ways (e.g., incrementing the stencil value for a clockwise winding order or decrementing the stencil value for a counterclockwise winding order).

In this example, GPU 12 does not shade the triangle primitives shown in FIG. 5B during stenciling. Rather, as noted above, triangle primitives that are rendered during stenciling only impact a stencil texture 90. That is, stencil texture 90 indicates the portions of the path that appear in the image, e.g., that are rendered and shaded.

As shown in FIG. 5C, GPU 12 determines a bounding box 92 that encompasses the stencil texture 90. That is, the bounding box covers the entire of the path that is to be filled. GPU 12 then performs stenciled TIR on bounding box 92 to generate filled path 96. In this way, GPU 12 determines bounding box 92 and fills path 80 in a single rendering pass.

Figure 6:
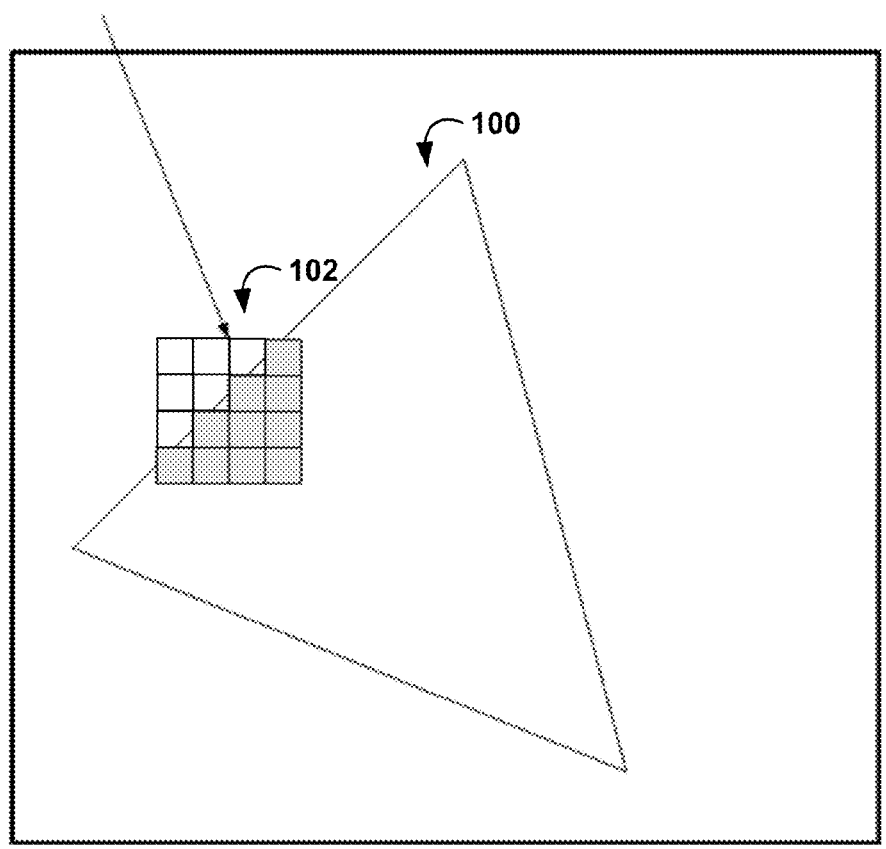
FIG. 6 is a conceptual diagram illustrating a stenciling operation.

FIG. 6 is a conceptual diagram illustrating a stenciling operation. For example, assume for purposes of illustration that GPU 12 renders primitive 100 using 16× MSAA. In this example, each square represents a sample of pixel 102.

According to aspects of this disclosure, GPU 12 may perform stenciled TIR. Accordingly, GPU 12 may determine a stencil parameter (e.g., the stencil sampling rate) independently from a render target parameter (e.g., memory allocation for a rendered pixel). In this example, GPU 12 may determine a coverage value for rendering the pixel based on whether the pixel passes a per sample stencil test.

In some examples, GPU 12 may perform a stencil test to determine if samples have a non-zero value. For example, GPU 12 may perform a zero/non-zero stencil test in which samples having non-zero stencil values are rendered. In another example, GPU 12 may perform an odd/even stencil test in which samples having an odd (or even) value are rendered. Accordingly, in some examples, GPU 12 may perform a stencil test to determine if samples have an odd value. In still other examples, GPU 12 may perform a stencil test to determine if samples have an even value.

In any case, in the example shown in FIG. 6, 10 of the 16 samples (again, represented by boxes) of pixel 102 are located within primitive 100. Accordingly, a coverage mask for primitive 100 may include pixel 102 and GPU 12 may shade pixel 102 during rendering.

Figure 7:
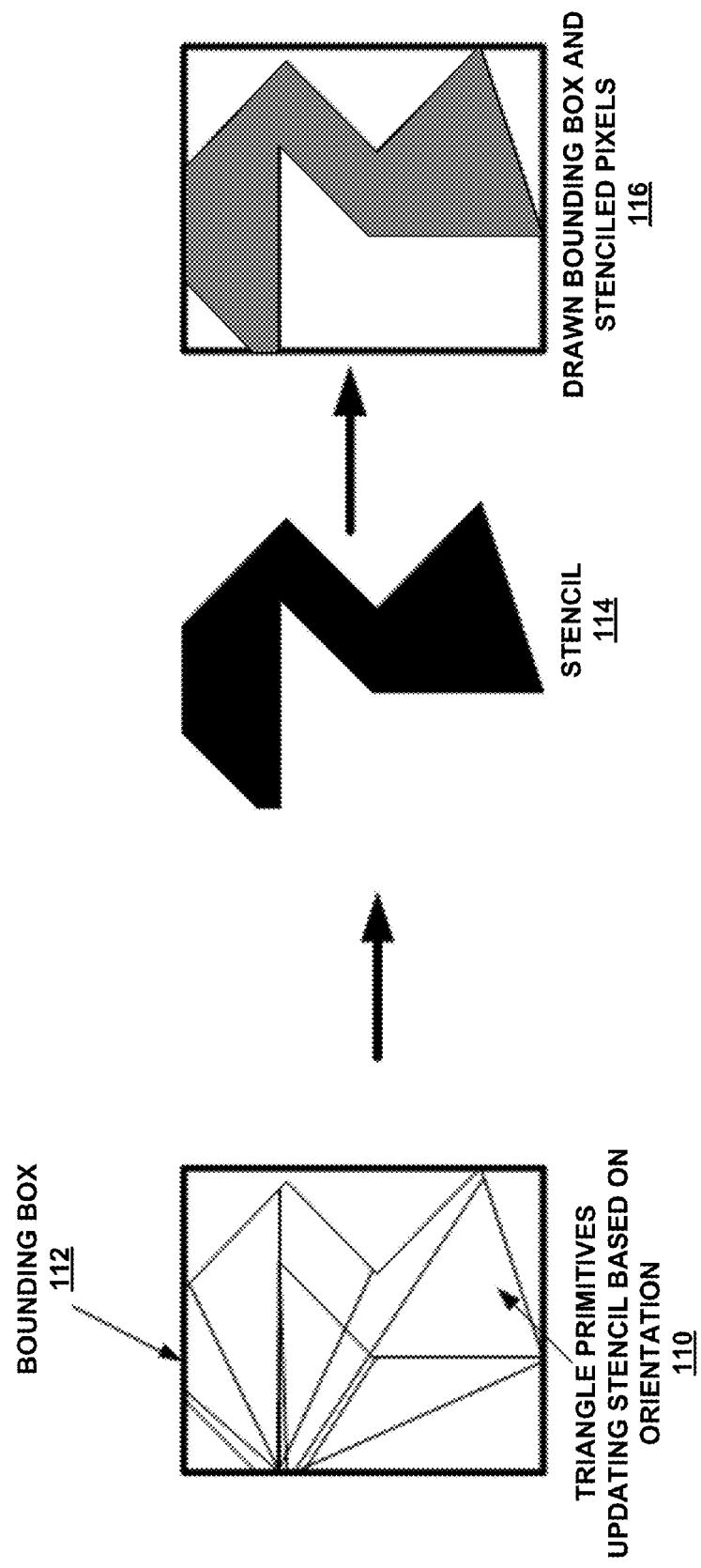
FIG. 7 is a conceptual diagram illustrating an example filling operation, according to aspects of this disclosure.

FIG. 7 is a conceptual diagram illustrating an example filling operation, according to aspects of this disclosure. For example, FIG. 7 illustrates determining triangle primitives and updating a stencil buffer based on the orientation of the primitives 110, determining a bounding box 112 based on the outermost points of the primitives, the contents of a stencil buffer 114, and a drawn bounding box and stenciled pixels 116.

According to some examples, the sequence of determining a bounding box during stenciling and rendering the primitives included in the stencil may be performed by GPU 12 using the following API call:

```
Draw_BB( );        // compute bounding box of primitives within the
                   draw call
                   // or it can be BeginQuery( )...EndQuery( )
                   // if pixel shader is not bound, then only bounding
                   box is
                   // computed and no primitives are rendered
Render_BB( );      // render the previously computed bounding box, or
                   it can
                   // DrawIndirect-like method
                   // same as draw call, except no primitives are sent,
                   but pixel
                   // shader and other back-end states are specified
``` where Draw_BB instructs GPU 12 to determine bounding box 112 during stenciling (without rendering pixels) and Render_BB instructs GPU 12 to perform stenciled TIR on top of the bounding box. In this way, GPU 12 may determine a bounding box and perform path filing in a single rendering pass.

Figure 8:
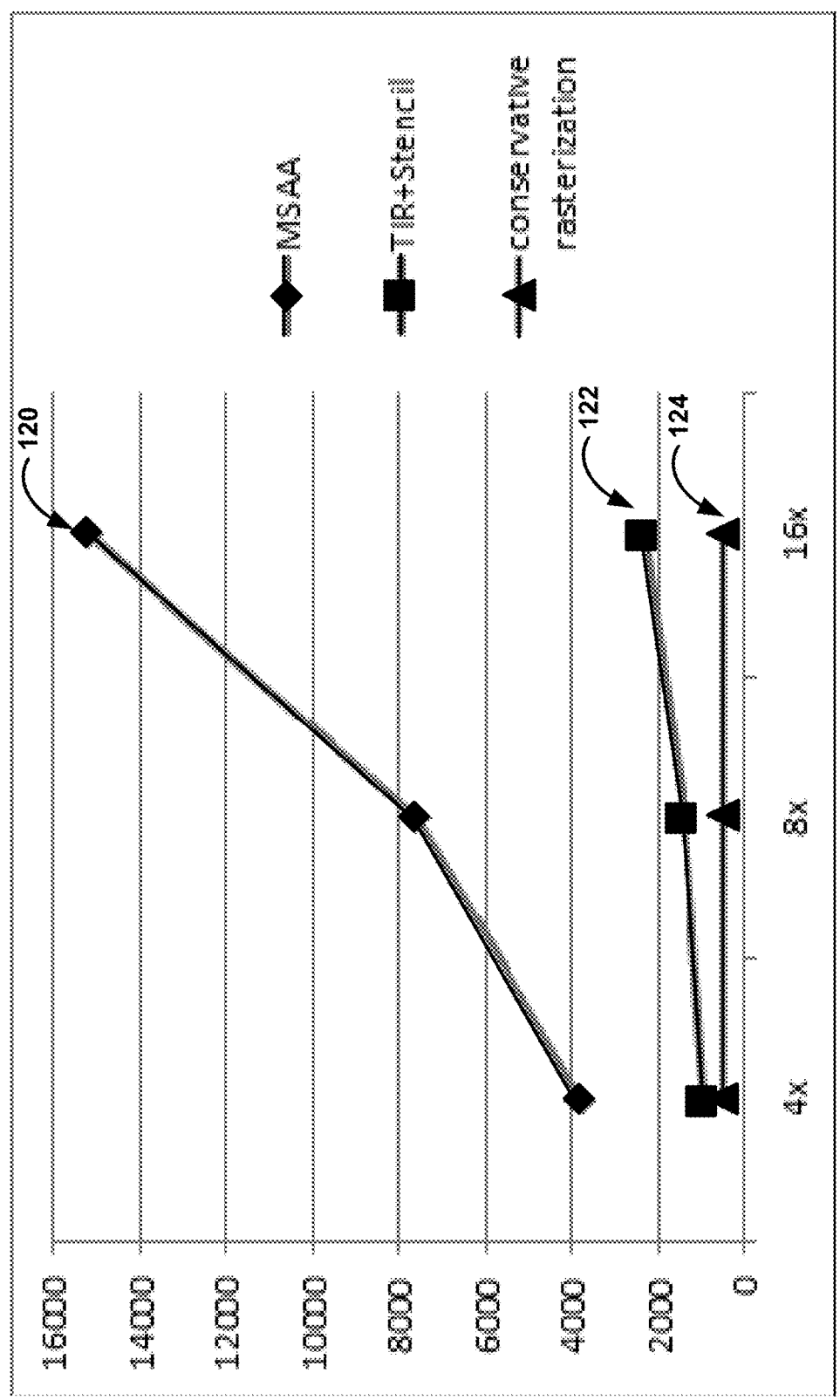
FIG. 8 is a graph illustrating bandwidth during rendering, according to aspects of this disclosure.

FIG. 8 is a graph illustrating memory bandwidth during rendering, according to aspects of this disclosure. For example, FIG. 8 illustrates three different antialiasing rates (4×, 8×, and 16×) and the associated data transfer associated with the rates for each of three rendering schemes: an MSAA scheme in which tessellation and geometry shading are performed 120, a stenciled TIR scheme 122, and a conservative rasterization scheme 124 (e.g., a Loop-Blinn process). The bandwidth requirements shown in FIG. 8 are associated with a test sequence of images rendered at 60 frames per second (fps) and a buffer format having 32 bits of color, 24 bits of depth, and 8 bits of stencil.

As shown in the graph of FIG. 8, the memory bandwidth requirement for MSAA 120 are significantly greater than the memory bandwidth requirement for stenciled TIR 122 and conservative rasterization 124. Table 1, shown below, illustrates a comparison of MSAA 120, conservative rasterization 124, and stenciled TIR 122.

TABLE 1

|  | MSAA | Conservative Rasterization | Stenciled TIR |
|---|---|---|---|
| Quality | Similar | Slightly better | Similar |
| Memory Bandwidth | High | Low (1 pixel per sample) | Low (stencil + 1 pixel per sample) |
| Pixel Shading | None | Very high | None |
| HW change | Already exist | Small | Moderate |
| API change | Already exist | Small | Moderate |
| Geometry Work | CPU (move to tessellation engine) | CPU (complex algorithm) | Less CPU (move to tessellation engine) |
| Generic Path Rendering | Yes | No | Yes |
| overlap paths | Yes | No | Yes |

Table 2, shown below, illustrates an additional comparison between MSAA 120, stenciled TIR 122 and conservative rasterization 124.

TABLE 2

|  | Nx MSAA: | Nx TIR + stencil: | Conservative Rasterization |
|---|---|---|---|
| Sample Test (HW) | Nx | Nx | 1x |
| Depth Buffer Update | Nx | None | None |

TABLE 2-continued

|  | Nx MSAA: | Nx TIR + stencil: | Conservative Rasterization |
|---|---|---|---|
| Stencil Buffer Update | Nx | Nx | None |
| Color Buffer Update | Nx | 1x | 1x |
| Pixel Shader Launch | 1x | 1x | 1x (relatively complicated pixel shading stage) |

FIGS. 9A-9D are a sequence of diagrams illustrating an example dashing operation for the path shown in FIG. 4. Again, path 80 is under tessellated in the example of FIGS. 9A-9D for purposes of illustration. In addition, while described with respect to GPU 12 for purposes of explanation, the process carried out in FIGS. 9A-9D may be performed by a variety of other processors.

Figure 9A:
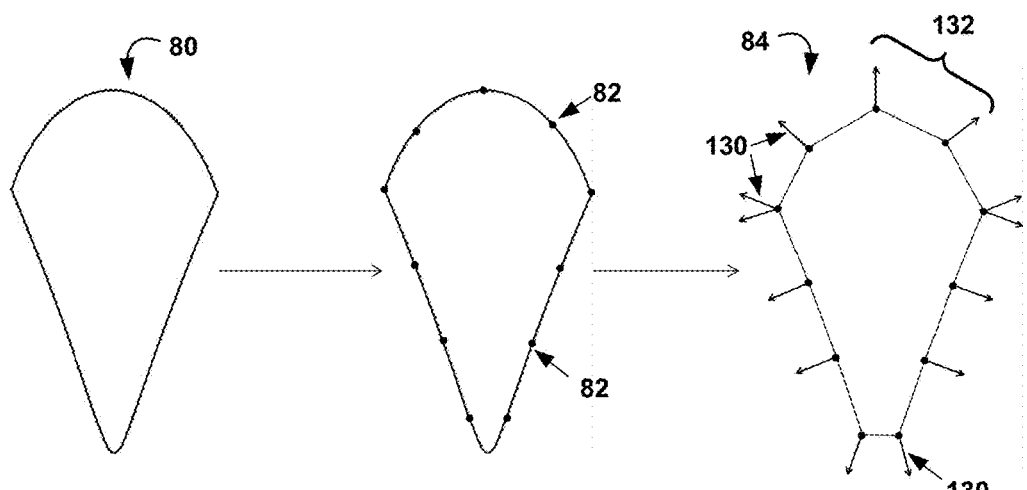
FIGS. 9A-9D are a sequence of diagrams illustrating an example dashing operation for the path shown in FIG. 4.

As shown in FIG. 9A, GPU 12 tessellates path 80 to include a number of vertices 82 that are connected in a linestrip 84. In addition, GPU 12 determines a number of normals 130 (shown as arrows extending from vertices). In the example of FIG. 9A, double normals 130 indicates a join location. Creating joins may require endpoint tangents of the next primitive in the linestrip. FIG. 9A also includes an example segment 132.

Figure 9B:
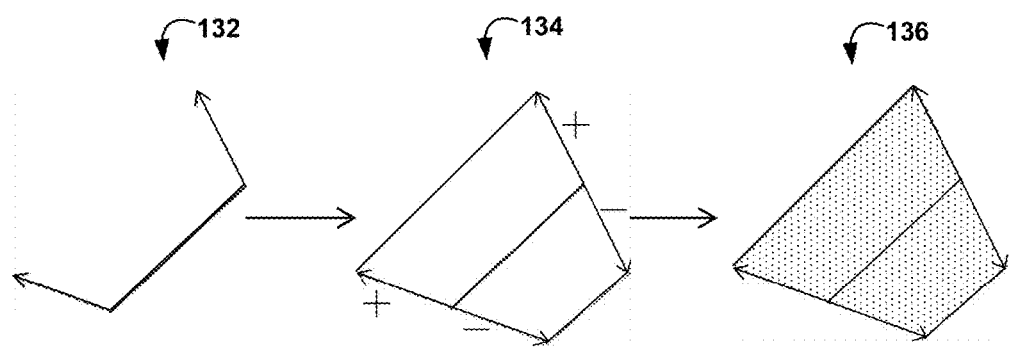

FIG. 9B illustrates GPU 12 performing a fattening operation on segment 132 in which the segment 132 is fattened in +/− normal directions by strokewidth/2. An extra thick stroke is shown in the example of FIG. 9B for purposes of illustration. FIG. 9B illustrates fattened segment 134 and stroked fattened segment 136.

Figure 9C:
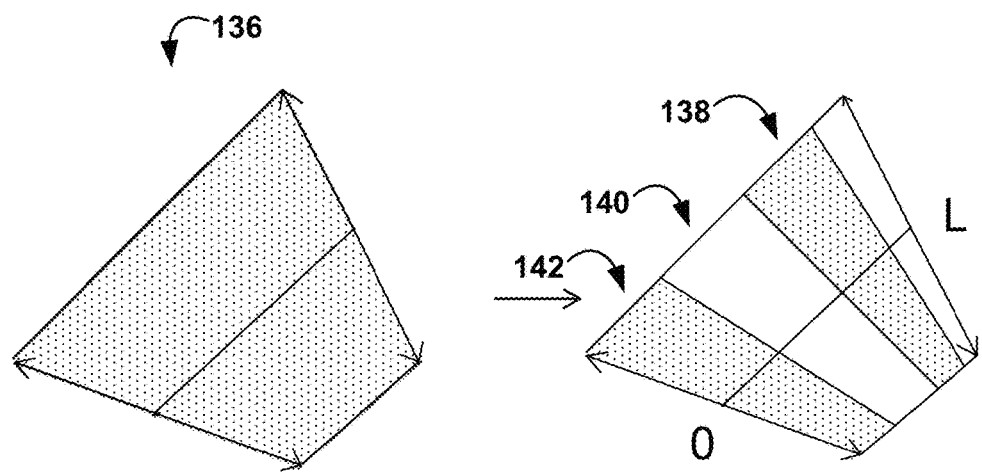

FIG. 9C illustrates dashing stroked fattened segment 136. For example, GPU 12 may determine a first dash segment 138, a second dash segment 140, and a third dash segment 142. In this example first dash segment 138 and third dash segment 142 are visible segments, while second dash segment 140 is an invisible dash segment. For dashing, GPU 12 determines the starting location for each dash segment (line) 138, 140, and 142. As noted above, in some examples, prefix sum unit 42 may accumulate the length of dash segments 138-142 during geometry shading.

GPU 12 may apply the lengths as a texture offset for texture coordinates from 0 to line length L. For example, according to aspects of this disclosure, prefix sum unit 42 may calculate a linelength value that indicates a location of each of segments 138-142. Prefix sum unit 42 may send a prefix summed linelength value to a pixel shader stage, which determines the respective locations of segments 138-142 during pixel shading. GPU 12 retains visible segments 138 and 142 (as shaded fragments) as forming a part of the visible dash pattern and discards segment 140 (without shading) as being invisible in the dash pattern.

In some examples, a graphics API that supports determining per primitive scalar values such as pointsize may be used to instruct GPU 12 to determine the scalar lengths. According to aspects of this disclosure, the graphics API may support a linelength value. This linelength value may be the same flat attribute of a primitive, but the attribute may be provided to a pixel shader stage. For example, GPU 12 may apply the prefix sum path per tessellated primitive to determine offset coordinates during pixel shading. In addition, API calls prsum_start, prsum_end (similar to query_start/end) may bracketize one or more draw calls to indicate the relative start and end of the dashed line.

Figure 9D:
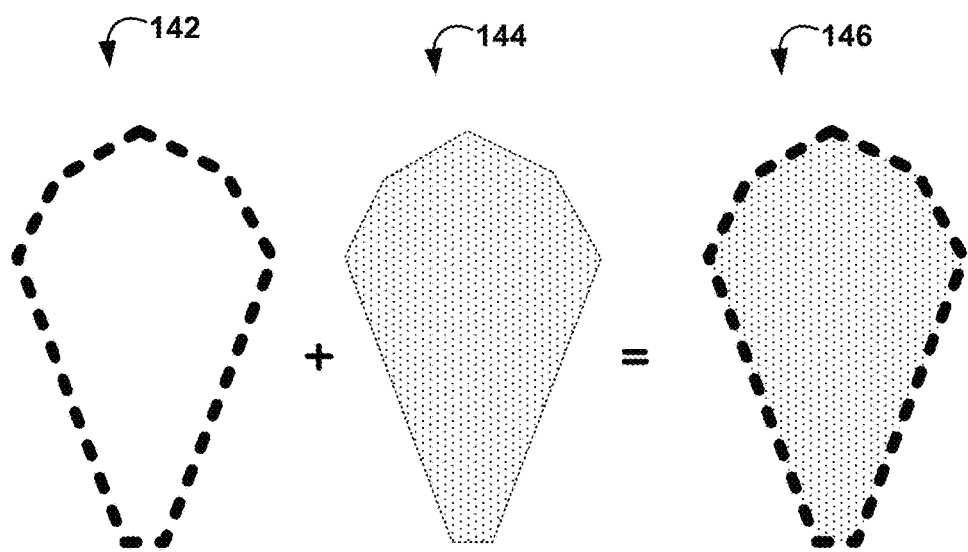

FIG. 9D illustrates the addition of a dashed stroke 142 with a filled path 144 to generate filled and dashed path 146.

Figure 10:
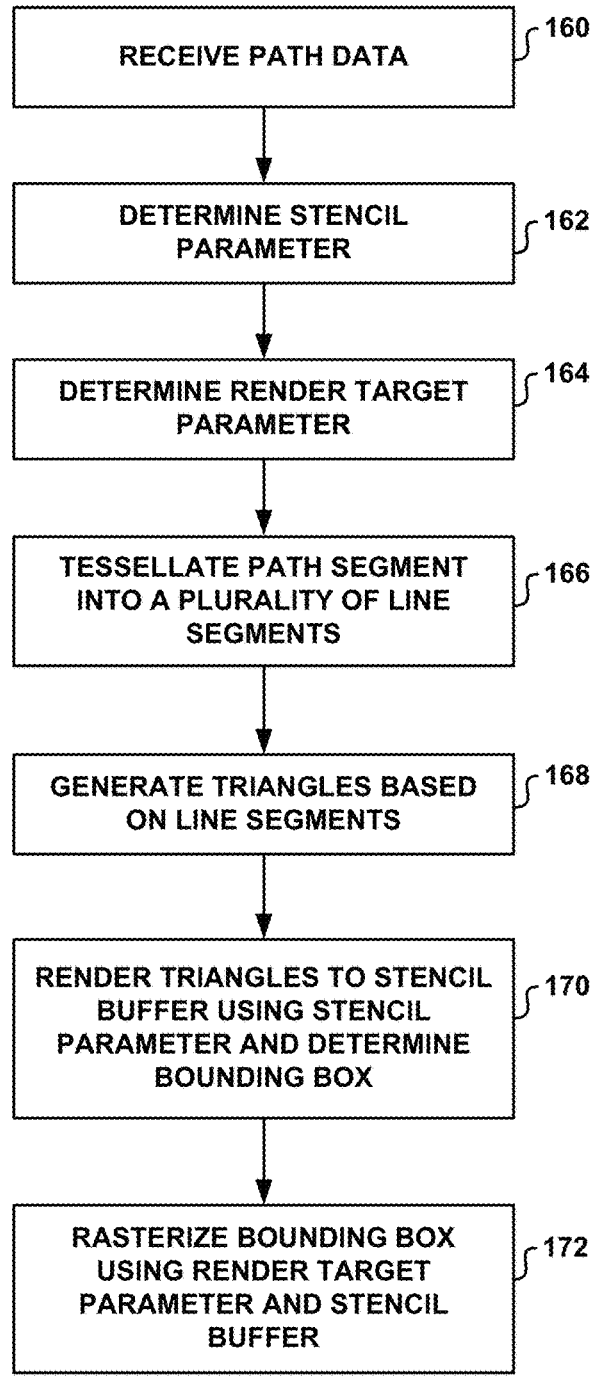
FIG. 10 is a flow diagram illustrating an example process for rendering graphics data, according to aspects of this disclosure.

FIG. 10 is a flow diagram illustrating an example technique for performing a filling operation according to this disclosure. While described as being performed by GPU 12 for purposes of illustration, it should be understood that the technique shown in FIG. 10 may be performed by a variety of other processors. In addition, fewer, additional, or different steps than those shown may be used to perform the technique.

In the example of FIG. 10. GPU 12 receives path data (160). The path data may be indicative of one or more path segments of a path to be rendered. GPU 12 also determines a stencil parameter (162). In some examples, the stencil parameter may indicate a sampling rate for determining a coverage value for each antialiased pixel of the path. GPU 12 also determines, separately from the stencil parameter, a render target parameter (164). The render target parameter may indicate a memory allocation for each antialiased pixel of the path.

GPU 12 tessellates a path segment defined by the path data into a plurality of line segments (166). For example, GPU 12 may tessellate the path data into a linestrip such as the one shown in FIG. 5A. GPU 12 then generates a plurality of triangle primitives based on the plurality of line segments (168). Each of the plurality of triangle primitives may be generated based on a respective one of the plurality of line segments. Each of the plurality of triangle primitives for a given path segment may share a common vertex. The other two vertices for each of the triangle primitives may correspond to the endpoints of a respective one of the plurality of line segments.

GPU 12 renders each of the plurality of triangle primitives into a common stencil buffer using the stencil parameter and determines a bounding box (170). For example, as noted above, GPU 12 does not shade the triangle primitives during stenciling. However. GPU 12 may determine the outermost points of the triangle primitives to determine the bounding box for the primitives. In some examples, GPU 12 may determine the coordinates for each triangle primitive and overwrite an upper boundary point, a lower boundary point, a right boundary point, and/or a left boundary point each time a primitive extends beyond the outermost point of the previous triangle primitive.

After rendering all of the triangle primitives into the stencil buffer, the stencil buffer may store data indicative of which pixels are inside of the fill area for the path segment. In addition, the bounding box encompasses each of the triangle primitives.

GPU 12 then rasterizes the bounding box using the render target parameter and the stencil buffer (172). For example, according to aspects of this disclosure, GPU 12 performs stenciled TIR on the bounding box to determine color values for each pixel of the path data. The data in the stencil buffer may cause pixels inside of the fill area to be shaded with a fill color and cause pixels that are outside of the fill area to remain unshaded. Once the rendering of the bounding box has completed, the render target (e.g., the frame buffer) may store a rasterized version of the fill area for the path segment using the render target parameter.

Figure 11:
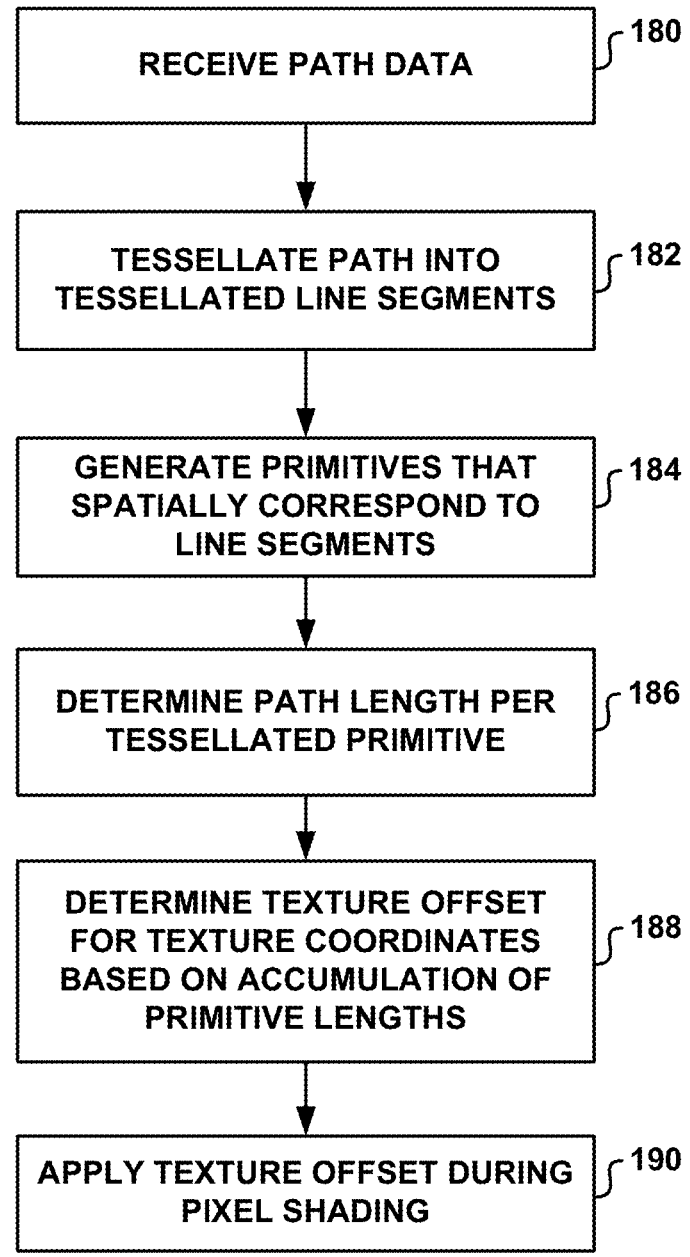
FIG. 11 is a flow diagram illustrating an example process for dashing, according to aspects of this disclosure.

FIG. 11 is a flow diagram illustrating an example technique for performing a stroking operation according to this disclosure. Again, while described as being performed by GPU 12 for purposes of illustration, it should be understood that the technique shown in FIG. 11 may be performed by a variety of other processors. In addition, fewer, additional, or different steps than those shown may be used to perform the technique.

GPU 12 receives path data (180). The path data may be indicative of one or more path segments of a path to be rendered. GPU 12 tessellates a path segment defined by the path data into a plurality of line segments (182). For example, GPU 12 may tessellate the path data into a linestrip such as the one shown in FIG. 9A.

GPU 12 generates a plurality of primitives that spatially corresponds to the stroke area for the path segment (184). For example, for each of the plurality of tessellated line segments, GPU 12 may generate one or more primitives that spatially correspond to a stroke area for the respective line segment. GPU 12 may determine a number of tessellated primitives per line segment during geometry shading of the line segment. That is, during geometry shading, GPU 12 may generate a stroke "without dashing" (e.g., without shading particular segments of the stroke).

When dashing, GPU 12 determines a path length per tessellated primitive (186). For example, GPU 12 may determine an accumulation of lengths for each dash segment (primitive) produced during geometry shading. That is, the dash segments may be ordered in a particular order (e.g., an order determined during tessellation and/or geometry shading). For each primitive, GPU 12 may accumulate the lengths of the primitives preceding it in order.

GPU 12 may determine a texture offset for texture coordinates of each primitive being rendered based on the accumulation of lengths (188). For example, as noted above, GPU 12 may use the length information to determine a texture coordinate for the beginning of each of the primitives. GPU 12 may apply the texture offset during pixel shading (190). For example, GPU 12 applies the texture offset and shades each of the segments of the dash using the appropriate color for the stroked path data.

In some examples, the techniques of this disclosure may allow users of DirectX 11 hardware to perform path rendering using DirectX 11 hardware or with hardware that has similar performance characteristics. In further examples, the techniques of this disclosure may provide an all-GPU rendering solution to path rendering.

Although the techniques of this disclosure have been primarily described with respect to a hardware architecture that is defined by the DX 11 graphics API, the techniques of this disclosure may also be performed in hardware architectures defined according to other on-chip, tessellation-enabled graphics APIs such as, e.g., the OpenGL graphics API (e.g., OpenGL versions 4.0, 4.1, 4.2, 4.3 and later versions). In examples where the techniques of this disclosure are implemented in a hardware architecture defined according to the OpenGL graphics API, one or more of the functions attributed to hull shader 48 in this disclosure may be performed by a tessellation control shader and/or one or more of the functions attributed to domain shader 52 in this disclosure may be performed by a tessellation evaluation shader.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of rendering graphics data, the method comprising:
   pixel shading, with a graphics processing unit (GPU), segments of the graphics data that precede a current segment of a plurality of ordered segments of a dashed line;
   determining, with the GPU, a texture offset for the current segment of the plurality of ordered segments of the dashed line, wherein the texture offset for the current segment of the plurality of ordered segments is based on an accumulation of lengths of the segments that precede the current segment in the order;
   applying the texture offset to determine a location of the current segment; and
   pixel shading the current segment at the determined location.

2. The method of claim 1, wherein the plurality of segments includes one or more visible segments and one or more invisible segments, the method further comprising:

determining, based on the determined location of the current segment, whether the current segment is a visible segment; and retaining the current segment based on the current segment being a visible segment or discarding the current segment based on the current segment not being a visible segment.

3. The method of claim 1, further comprising:

prior to determining the texture offset for the current segment, geometry shading the dashed line to form the plurality of ordered segments; and determining a length value for the current segment, such that determining the texture offset based on the accumulation of lengths comprises determining the texture offset based on the length value.

4. The method of claim 3, wherein determining the length value comprises generating a linelength scalar value specifying a length of preceding segments in the order.

5. The method of claim 1, further comprising:

rasterizing each of the segments of the plurality of ordered segments, wherein applying the texture offset comprises applying the texture offset to the rasterized current segment after the current segment has been rasterized.

6. The method of claim 1, wherein applying the texture offset comprises determining a texture coordinate value for the current segment indicating the location.

7. The method of claim 1, wherein the pixel shading is included in a path rendering process for the dashed line including stroking the dashed line.

8. The method of claim 1, further comprising determining the order of the segments during geometry shading of the segments, such that the order of the segments is a primitive order.

9. An apparatus for rendering graphics data, the apparatus comprising:

a graphics processing unit (GPU) configured to:

pixel shade segments of the graphics data that precede a current segment of a plurality of ordered segments of a dashed line;

determine a texture offset for the current segment of the plurality of ordered segments of the dashed line, wherein the texture offset for the current segment of the plurality of ordered segments is based on an accumulation of lengths of the segments that precede the current segment in the order;

apply the texture offset to determine a location of the current segment; and pixel shade the current segment at the determined location; and a memory configured to store the current segment.

10. The apparatus of claim 9, wherein the plurality of segments includes one or more visible segments and one or more invisible segments, the GPU further configured to:

determine, based on the determined location of the current segment, whether the current segment is a visible segment; and retain the current segment based on the current segment being a visible segment or discard the current segment based on the current segment not being a visible segment.

11. The apparatus of claim 9, wherein the GPU is further configured to:

prior to determining the texture offset for the current segment, geometry shade the dashed line to form the plurality of ordered segments; and determine a length value for the current segment, such that determining the texture offset based on the accumulation of lengths comprises determining the texture offset based on the length value.

12. The apparatus of claim 11, wherein to determine the length value, the GPU is configured to generate a linelength scalar value specifying a length of preceding segments in the order.

13. The apparatus of claim 9, wherein the GPU is further configured to:

rasterize each of the segments of the plurality of ordered segments, wherein to apply the texture offset, the GPU is configured to apply the texture offset to the rasterized current segment after the current segment has been rasterized.

14. The apparatus of claim 9, wherein to apply the texture offset, the GPU is configured to determine a texture coordinate value for the current segment indicating the location.

15. The apparatus of claim 9, wherein the pixel shading is included in a path rendering process for the dashed line including stroking the dashed line.

16. The apparatus of claim 9, wherein the GPU is further configured to determine the order of the segments during geometry shading of the segments, such that the order of the segments is a primitive order.

17. An apparatus for rendering graphics data, the apparatus comprising:

means for pixel shading, with a graphics processing unit (GPU), segments of the graphics data that precede a current segment of a plurality of ordered segments of a dashed line;

means for determining, with the GPU, a texture offset for the current segment of the plurality of ordered segments of the dashed line, wherein the texture offset for the current segment of the plurality of ordered segments is based on an accumulation of lengths of the segments that precede the current segment in the order;

means for applying the texture offset to determine a location of the current segment; and means for pixel shading the current segment at the determined location.

18. The apparatus of claim 17, wherein the plurality of segments includes one or more visible segments and one or more invisible segments, the apparatus further comprising:

means for determining, based on the determined location of the current segment, whether the current segment is a visible segment; and means for retaining the current segment based on the current segment being a visible segment or discarding the current segment based on the current segment not being a visible segment.

19. The apparatus of claim 17, further comprising:

prior to determining the texture offset for the current segment, means for geometry shading the dashed line to form the plurality of ordered segments; and means for determining a length value for the current segment, such that determining the texture offset based on the accumulation of lengths comprises determining the texture offset based on the length value.

20. The apparatus of claim 19, wherein the means for determining the length value comprises means for generating a linelength scalar value specifying a length of preceding segments in the order.

21. The apparatus of claim 17, further comprising:

means for rasterizing each of the segments of the plurality of ordered segments, wherein the means for applying the texture offset comprises means for applying the texture offset to the rasterized current segment after the current segment has been rasterized.

22. The apparatus of claim 17, wherein the means for applying the texture offset comprises means for determining a texture coordinate value for the current segment indicating the location.

23. The apparatus of claim 17, further comprising means for determining the order of the segments during geometry shading of the segments, such that the order of the segments is a primitive order.

24. A non-transitory computer-readable medium having instructions stored thereon that, when executed, cause a graphics processing unit (GPU) to:
pixel shade, with the GPU, segments of the graphics data that precede a current segment of a plurality of ordered segments of a dashed line;
determine a texture offset for the current segment of the plurality of ordered segments of the dashed line, wherein the texture offset for the current segment of the plurality of ordered segments is based on an accumulation of lengths of the segments that precede the current segment in the order;
apply the texture offset to determine a location of the current segment; and
pixel shade the current segment at the determined location.

25. The non-transitory computer-readable medium of claim 24, wherein the plurality of segments includes one or more visible segments and one or more invisible segments, the instructions further causing the GPU to:
determine, based on the determined location of the current segment, whether the current segment is a visible segment; and
retain the current segment based on the current segment being a visible segment or discard the current segment based on the current segment not being a visible segment.

26. The non-transitory computer-readable medium of claim 24, wherein the instructions further cause the GPU to:
prior to determining the texture offset for the current segment, geometry shade the dashed line to form the plurality of ordered segments; and
determine a length value for the current segment, such that determining the texture offset based on the accumulation of lengths comprises determining the texture offset based on the length value.

27. The non-transitory computer-readable medium of claim 26, wherein to determine the length value, the instructions cause the GPU to generate a linelength scalar value specifying a length of preceding segments in the order.

28. The non-transitory computer-readable medium of claim 24, wherein the instructions further cause the GPU to:
rasterize each of the segments of the plurality of ordered segments,
wherein to apply the texture offset, the instructions cause the GPU to apply the texture offset to the rasterized current segment after the current segment has been rasterized.

29. The non-transitory computer-readable medium of claim 24, wherein to apply the texture offset, the instructions cause the GPU to determine a texture coordinate value for the current segment indicating the location.

30. The non-transitory computer-readable medium of claim 24, wherein the instructions further cause the GPU to determine the order of the segments during geometry shading of the segments, such that the order of the segments is a primitive order.

* * * * *